US011935456B2

(12) United States Patent
Kim et al.

(10) Patent No.: US 11,935,456 B2
(45) Date of Patent: Mar. 19, 2024

(54) PIXEL CIRCUIT AND PIXEL DRIVING APPARATUS

(71) Applicant: LX Semicon Co., Ltd., Daejeon (KR)

(72) Inventors: Won Youn Kim, Daejeon (KR); Byung Gwan Jeon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/084,441

(22) Filed: Dec. 19, 2022

(65) Prior Publication Data

US 2023/0197005 A1 Jun. 22, 2023

(30) Foreign Application Priority Data

Dec. 21, 2021 (KR) ........................ 10-2021-0184041

(51) Int. Cl.
*G09G 3/20* (2006.01)

(52) U.S. Cl.
CPC ... *G09G 3/2014* (2013.01); *G09G 2300/0426* (2013.01); *G09G 2300/0804* (2013.01); *G09G 2300/0814* (2013.01); *G09G 2300/0819* (2013.01); *G09G 2300/0852* (2013.01); *G09G 2300/0861* (2013.01); *G09G 2310/0259* (2013.01); *G09G 2310/08* (2013.01)

(58) Field of Classification Search
CPC ..... G09G 3/32-3291; G09G 2300/0809-0871
See application file for complete search history.

(56) References Cited

U.S. PATENT DOCUMENTS

| | | | | |
|---|---|---|---|---|
| 7,535,447 | B2 * | 5/2009 | Kwak | G09G 3/3233 345/87 |
| 7,542,019 | B2 * | 6/2009 | Park | G09G 3/3233 345/82 |
| 7,557,784 | B2 * | 7/2009 | Kwak | G09G 3/3233 |
| 7,679,587 | B2 * | 3/2010 | Kwak | G09G 3/325 345/82 |
| 9,468,050 | B1 * | 10/2016 | Rotzoll | G09G 3/3275 |
| 10,832,615 | B2 | 11/2020 | Kim et al. | |
| 10,861,382 | B2 | 12/2020 | Hsieh et al. | |
| 10,930,213 | B2 * | 2/2021 | Liang | G09G 3/3241 |
| 11,176,884 | B2 * | 11/2021 | Chang | G09G 3/325 |
| 11,430,372 | B2 * | 8/2022 | Xuan | G09G 3/2074 |
| 11,462,155 | B1 * | 10/2022 | Vigier | G09G 3/2014 |
| 11,488,520 | B2 * | 11/2022 | Lee | G09G 3/32 |
| 11,551,606 | B2 * | 1/2023 | Kim | G09G 3/3233 |
| 11,610,534 | B2 * | 3/2023 | Sun | G09G 3/3233 |
| 2006/0114193 | A1 * | 6/2006 | Kwak | G09G 3/3233 345/76 |

(Continued)

*Primary Examiner* — Patrick F Marinelli
(74) *Attorney, Agent, or Firm* — POLSINELLI PC

(57) ABSTRACT

The present disclosure relates to a pixel circuit and pixel driving apparatus technology. In this technology, two LEDs are arranged in parallel and selectively used in a hybrid manner in which a PWM (pulse width modulation) scheme for supplying a ramp voltage as a gate voltage for a transistor arranged within a pixel and for turning off the LEDs at the moment when the gate voltage becomes equal to a threshold voltage and a PAM (pulse amplitude modulation) scheme for determining a starting value of the ramp voltage based on a grayscale value of the pixel are combined.

20 Claims, 21 Drawing Sheets

(56) References Cited

U.S. PATENT DOCUMENTS

| | | | | |
|---|---|---|---|---|
| 2006/0124944 | A1* | 6/2006 | Kwak | G09G 3/325<br>257/96 |
| 2006/0125737 | A1* | 6/2006 | Kwak | G09G 3/3233<br>345/76 |
| 2006/0125807 | A1* | 6/2006 | Park | G09G 3/3233<br>345/204 |
| 2006/0139257 | A1* | 6/2006 | Kwak | G09G 3/3233<br>345/76 |
| 2016/0335937 | A1* | 11/2016 | Lee | G09G 3/2074 |
| 2019/0108790 | A1* | 4/2019 | Liang | G09G 3/3241 |
| 2020/0258447 | A1* | 8/2020 | Chang | G09G 3/3291 |
| 2020/0403131 | A1* | 12/2020 | Kim | H01L 25/167 |
| 2021/0358387 | A1* | 11/2021 | Xuan | G09G 3/32 |
| 2021/0366372 | A1* | 11/2021 | Sun | G09G 5/10 |
| 2021/0390902 | A1* | 12/2021 | Lee | G09G 3/32 |
| 2022/0199001 | A1* | 6/2022 | Kim | G09G 3/3233 |
| 2022/0310008 | A1* | 9/2022 | Jin | G09G 3/2011 |
| 2022/0310011 | A1* | 9/2022 | Chen | G09G 3/3233 |
| 2023/0049527 | A1* | 2/2023 | Lee | G09G 3/2007 |
| 2023/0154387 | A1* | 5/2023 | Lee | G09G 3/2022<br>345/55 |
| 2023/0197005 | A1* | 6/2023 | Kim | G09G 3/32<br>345/214 |
| 2023/0238487 | A1* | 7/2023 | Hwang | H01L 33/62<br>257/79 |

* cited by examiner

*FIG. 1*

PIXEL CIRCUIT AND PIXEL DRIVING APPARATUS

CROSS REFERENCE TO RELATED APPLICATION

This application claims priority to Korean Patent Application No. 10-2021-0184041, filed on Dec. 21, 2021, which is hereby incorporated by reference for all purposes as if fully set forth herein.

BACKGROUND

1. Field of Technology

The present disclosure relates to a pixel circuit and pixel driving apparatus technology.

2. Description of the Prior Art

With the development of informatization, various display devices capable of visualizing information are being developed. A liquid crystal display (LCD), an organic light emitting diode (OLED) display device and a plasma display panel (PDP) display device are representative examples of display devices which have been developed so far or are being developed. These display devices are being developed to appropriately display high-resolution images.

However, the above-described display devices have advantages in terms of high resolution, but have disadvantages in that it is difficult to fabricate the display devices in large sizes. For example, since large OLED display devices developed so far have sizes of 80 inches (about 2 m) and 100 inches (about 2.5 m), they are not suitable to be made into a large display device with a width of more than 10 m.

As a method for solving such a problem in terms of large size, the interest in a light emitting diode (LED) display device is increasing recently. In an LED display device technology, a single large panel may be configured by disposing a required number of modular LED pixels. Alternatively, in the LED display device technology, a single large panel structure may be configured by disposing a required number of unit panels including a plurality of LED pixels. As described above, in the LED display device technology, a large display device may be easily realized by disposing as many LED pixels as required.

The LED display device is advantageous not only for large size but also for various panel sizes. In the LED display device technology, it is possible to variously adjust horizontal and vertical sizes based on proper arrangement of LED pixels.

Meanwhile, a display panel where LEDs are arranged may be driven in a variety of ways. Some typical examples are Pulse Amplitude Modulation (PAM) and Pulse Width Modulation (PWM). In the PAM scheme, an analog voltage corresponding to a grayscale value of a pixel is supplied to the pixel, and the level of a current flowing to the pixel is controlled differently depending on the analog voltage, which is problematic in that low grayscale levels are hard to represent on a display panel where LEDs are arranged. The PWM is a scheme in which the amount of time spent on a current supplied to a pixel is adjusted based on the grayscale value of the pixel. A problem with the PWM is that, since a conventional active type requires a comparator circuit within a pixel, the pixel structure becomes complicated and not uniform in accuracy depending on an offset of the comparator.

Moreover, a display panel where LEDs are arranged needs to be discarded or undergo a repair process if an LED is defective or a defective pixel occurs in a transfer process.

The discussions in this section are only to provide background information and do not constitute an admission of prior art.

SUMMARY OF THE INVENTION

In this background, the present disclosure has been made in an effort to provide a technology that makes it easier to represent low grayscale levels on a display panel where LEDs are arranged. Another aspect of the present disclosure is to provide a technology for driving pixels in a PWM scheme without using a comparator. Yet another aspect of the present disclosure is to provide a hybrid pixel driving technology in which PAM and PWM are combined. A further aspect of the present disclosure is to provide a technology in which a display panel is used without a repair process if an LED is defective or a defective pixel occurs in a transfer process.

In an aspect, the present disclosure provides a pixel circuit comprising: a first path circuit including a first transistor and a second transistor, which are arranged in series between a high driving voltage and a low driving voltage, and having a first node formed between the first transistor and the second transistor; and a second path circuit comprising a third transistor, a fourth transistor, and a first LED, which are arranged in series between the high driving voltage and the low driving voltage, and a fifth transistor, a sixth transistor, and a second LED, which are arranged in parallel with the third transistor, the fourth transistor, and the first LED, wherein gates of the third transistor and the fifth transistor are electrically connected to the first node, and only either the fourth transistor or the sixth transistor is selected so that either the first LED or the second LED emits light, wherein a ramp voltage, which increases or decreases with time, is supplied to a gate of the second transistor and a starting value of the ramp voltage is determined based on a grayscale value of the pixel.

A gate-source voltage of the second transistor may increase or decrease according to the ramp voltage and the LED may turn off at the moment when the gate-source voltage becomes equal to a threshold voltage of the second transistor.

In another aspect, the present disclosure provides a pixel circuit comprising: a first path circuit including a first transistor for controlling the supply of a high driving voltage to a first node and a second transistor for controlling the supply of a low driving voltage to the first node; and a second path circuit comprising a third transistor for controlling the supply of the high driving voltage to an anode of a first LED, a fourth transistor arranged between the first LED and the third transistor, a fifth transistor for controlling the supply of the high driving voltage to an anode of a second LED arranged in parallel with the first LED, a sixth transistor arranged between the second LED and the fifth transistor, and a seventh transistor for controlling the supply of the low driving voltage to cathodes of the first LED and the second LED, wherein gates of the third transistor and the fourth transistor are electrically connected to the first node, and only either the fourth transistor or the sixth transistor is selected, wherein, once the high driving voltage is formed at the first node, the third transistor and the fifth transistor turn on, and, when only either the fourth transistor or the sixth transistor is selected to supply the low driving voltage to the cathode of one of the first and second LEDs while the third transistor and the fifth transistor are on, either the first LED or the second LED emits light, wherein a ramp voltage, which increases or decreases with time, is supplied to a gate of the second transistor and a starting value of the ramp voltage is determined based on a grayscale value of a pixel.

In yet another aspect, the present disclosure provides a pixel driving apparatus in which a pixel comprises: a first path circuit including a first transistor and a second transistor, which are arranged in series between a high driving voltage and a low driving voltage, and having a first node formed between the first transistor and the second transistor, and a first capacitor being arranged between a gate of the second transistor and a data line; and a second path circuit comprising a third transistor, a fourth transistor, and a first LED, which are arranged in series between the high driving voltage and the low driving voltage, and a fifth transistor, a sixth transistor, and a second LED, which are arranged in parallel with the third transistor, the fourth transistor, and the first LED, wherein gates of the third transistor and the fifth transistor are electrically connected to the first node, and only either the fourth transistor or the sixth transistor is selected so that only either the first LED or the second LED emits light, wherein a ramp voltage which increases or decreases with time is formed at the gate of the second transistor, and a data voltage determined based on a grayscale value of the pixel is supplied as a starting value of the ramp voltage to the data line.

A control cycle for the pixel may be divided into an initialization period, a program period, and a light emission control period, wherein, during the program period, an initial voltage corresponding to the grayscale value of the pixel is supplied as the data voltage, and, during the light emission control period, the data voltage is changed to a constant voltage and then increases or decreases with a constant gradient from the constant voltage.

As explained above, according to the present disclosure, it may become easier to produce low grayscale levels on a display panel where LEDs are arranged. Also, according to the present disclosure, pixels may be driven in a PWM scheme without using a comparator. Moreover, according to the present disclosure, a hybrid pixel driving technology can be used in which PAM and PWM are combined. In addition, according to the present disclosure, a display panel can be used without a repair process if an LED is defective or a defective pixel occurs in a transfer process.

BRIEF DESCRIPTION OF THE DRAWINGS

FIG. 1 is a configuration diagram of a display device according to an embodiment.

DETAILED DESCRIPTION OF THE EXEMPLARY EMBODIMENTS

Figure 2:
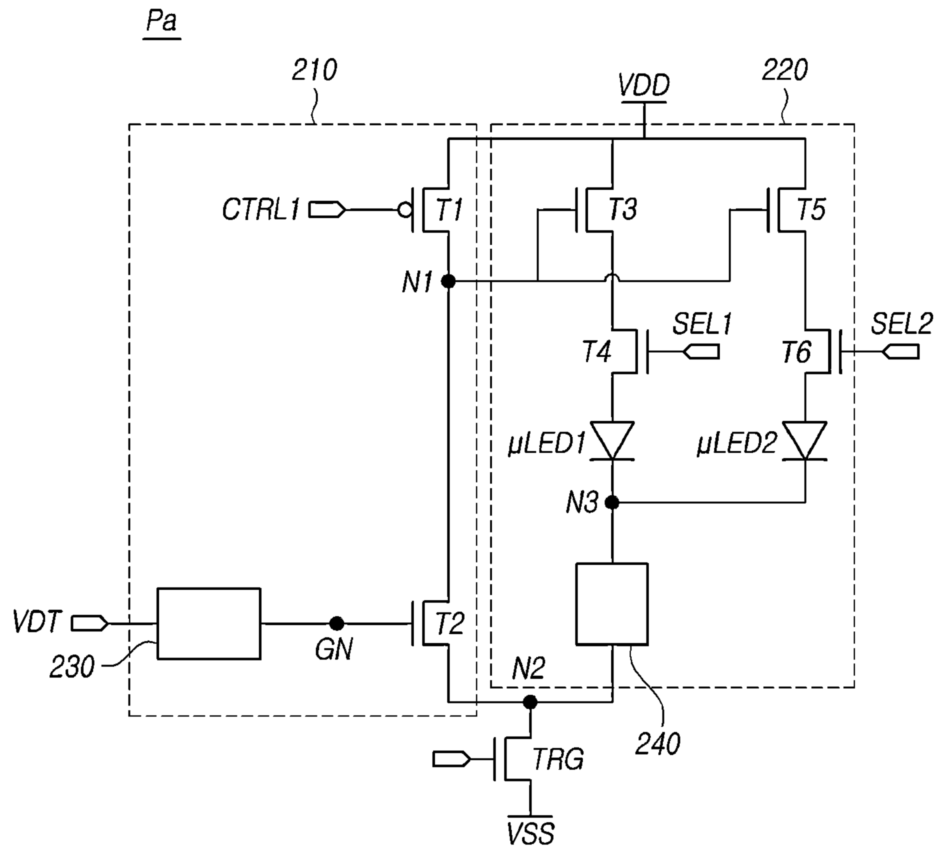
FIG. 2 is a configuration diagram of a first example of a pixel according to an embodiment.

FIG. 1 is a configuration diagram of a display device according to an embodiment.

Referring to FIG. 1, the display device 100 may include a display panel 110, a data processor 120, a gate driver 130, a pixel driver 140, etc.

Figure 18:
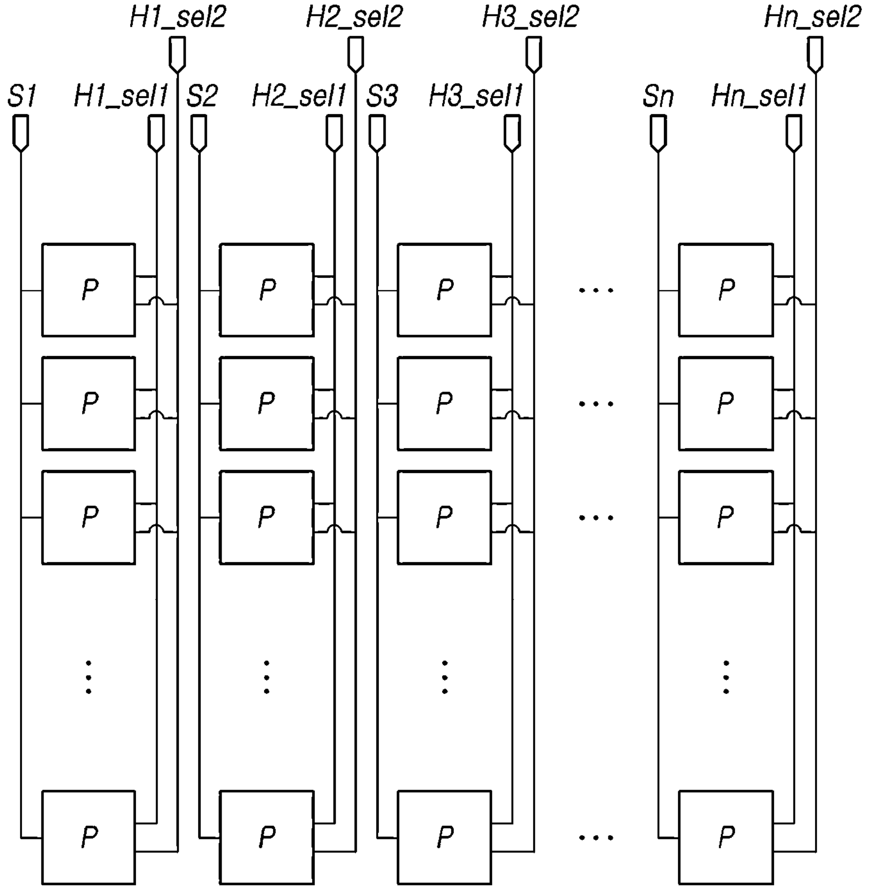
FIGS. 18 and 19 are views of a pixel arrangement on a display panel according to other embodiments.

A plurality of pixels P may be disposed on the display panel 110 in horizontal and vertical directions. As illustrated in FIG. 18 to be described later, the plurality of pixels P may be arranged in a matrix form in a first direction and a second direction.

At least two LEDs (light emitting diodes) may be arranged in each pixel P. Both of the two LEDs may be used, or one of the two LEDs may be selectively used by using selection signals as described later. Also, each pixel P may represent a grayscale value based on the total amount of electric power or current supplied to the LEDs.

A plurality of transistors and at least one capacitor may be arranged in each pixel P. For example, eleven transistors and two capacitors may be arranged in each pixel P. The total amount of electric power or current supplied to the LEDs may be determined by the operation of these transistors and capacitors. An example of a pixel structure of each pixel P will be described later.

The data processor 120 may receive image data RGB from an external device such as a host, convert the image data RGB into data suitable for the pixel driver 140, and then transmit it to the pixel driver 140.

Also, the data processor 120 may control timings of other components included in the display device 100 and provide set values for the timings. In this respect, the data processor 120 also may be called a timing controller.

The data processor 120 may send a gate clock GCLK and a gate control signal GCS to the gate driver 130. Then, the gate driver 130 may generate a scan signal SCN based on the gate clock GCLK and feed the scan signal SCN to a pixel P.

The pixel P to which the scan signal SCN is fed may be supplied with a data voltage VDT. Also, the brightness of the pixel P may be controlled by a data voltage VDT.

The pixel driver 140 may feed the data voltage VDT to the pixel P to which the scan signal SCN is fed. The pixel driver 140 may receive image data RGB and a data control signal DCS from the data processor 120, and check the grayscale value of each pixel P. Also, the pixel driver 140 may generate a data voltage VDT based on the grayscale value of each pixel P, and feed the data voltage VDT to the corresponding pixel P.

The pixel driver 140 may drive the pixel Pin a hybrid manner in which PAM and PWM are combined. The pixel driver 140 may determine an initial value of the data voltage VDT based on the grayscale value of each pixel P and supply it to the pixel P, as in the PAM scheme. Also, the pixel P may represent a grayscale value based on the ON time of the LEDs in one control cycle, where the ON time of the LEDs may be determined by the initial value of the data voltage VDT.

For such a pixel driving scheme, at least one control signal CTRL may be supplied to each pixel P. This control signal CTRL may be supplied by the pixel driver 140 or the gate driver 130. Some of the transistors arranged in each pixel P may be turned on or off by this control signal CTRL.

The gate driver 130 and the pixel driver 140 may constitute a single integrated circuit. Alternatively, they each may constitute an integrated circuit.

FIG. 2 is a configuration diagram of a first example of a pixel according to an embodiment.

Referring to FIG. 2, the pixel P may include a first path circuit 210, a second path circuit 220, a connection control transistor TRG, and so on.

The first path circuit 210 may include a first transistor T1 and a second transistor T2 which are arranged in series between a high driving voltage VDD and a low driving voltage VSS. Also, the first path circuit 210 may include a gate control circuit 230 for controlling a gate of the second transistor T2.

The first transistor T1 is a P-type transistor, one side of which may be connected to the high driving voltage VDD and the other side of which may be connected to a first node N1. Also, a first control signal CTRL1 may be supplied to the gate of the first transistor T1, and the first control signal CTRL1 may be supplied by the pixel driver or the gate driver.

The first transistor T1 may control the supply of the high driving voltage VDD to the first node N1. When the first transistor T1 turns on, the high driving voltage VDD may be supplied to the first node N1.

One side of the second transistor T2 may be connected to the first node N1, and the other side may be connected to a second node N2. One side of the connection control transistor TRG may be connected to the second node N2, and the other side may be connected to the low driving voltage VSS.

The second transistor T2 may substantially control the supply of the low driving voltage VSS to the first node N1. When the connection control transistor TRG turns on, the low driving voltage VSS may be supplied to the second node N2. In this state, when the second transistor T2 turns on, the low driving voltage VSS may be supplied to the first node N1.

When the first transistor T1 turns on while the connection control transistor TRG is on, the high driving voltage VDD may be formed at the first node N1, and when the second transistor T2 turns on while the connection control transistor TRG is on, the low driving voltage VSS may be formed at the first node N1.

The second path circuit 220 may include a third transistor T3, a fourth transistor T4, and a first LED uLED1, which are arranged in series between the high driving voltage VDD and the low driving voltage VSS. The second path circuit 220 may include a fifth transistor T5, a sixth transistor T6, and a second LED uLED2, which are arranged in parallel with the third transistor T3, the fourth transistor T4, and the first LED uLED1. In the case of the second path circuit 220, only either the fourth transistor T4 or the sixth transistor T6 may be selected by a first selection signal SEL1 and a second selection signal SEL2, so that only either the first LED uLED1 or the second LED uLED2 may emit light.

Moreover, the second path circuit 220 may include a current control circuit 240 for controlling the level of a driving current ILED1 or ILED2 flowing to either the first LED uLED1 or the second LED uLED2.

One side of the third transistor T3 may be connected to the high driving voltage VDD, and the other side may be connected to one side of the fourth transistor T4. Also, a gate of the third transistor T3 may be connected to the first node N1.

One side of the fourth transistor T4 may be connected to the other side of the third transistor T3, and the other side thereof may be connected to the first LED uLED1. A gate of the fourth transistor T4 may be connected to a first selection line and receive the first selection signal SELL An anode of the first LED uLED1 may be connected to the other side of the fourth transistor T4, and a cathode of the first LED uLED1 may be connected to the third node N3.

One side of the fifth transistor T5 may be connected to the high driving voltage VDD, and the other side may be connected to one side of the sixth transistor T6. Also, a gate of the fifth transistor T5 may be connected to the first node N1.

One side of the sixth transistor T6 may be connected to the other side of the fifth transistor T5, and the other side thereof may be connected to the second LED uLED2. A gate of the sixth transistor T6 may be connected to a second selection line and receive the second selection signal SEL2.

An anode of the second LED uLED2 may be connected to the other side of the sixth transistor T6, and a cathode of the second LED uLED2 may be connected to the third node N3.

In addition, in some embodiments, a current control circuit 240 may be arranged between the cathodes of the first LED uLED1 and second LED uLED2 and the second node N2.

Here, the pixel P may be formed on a silicon backplane, and the transistors T1, T2, T3, and TRG arranged in the pixel P may be formed as CMOS (complementary metal-oxide-silicon) type.

The operation of each component will now be described. When a high voltage—for example, a high driving voltage VDD—is formed at the first node N1, either the third transistor T3 or the fifth transistor T5 may turn on, and a first driving current ILED1 and a second driving current ILED2 may flow to either the first LED uLED1 or the second LED uLED2. Also, when a low voltage—for example, a low driving voltage VSS—is formed at the first node N1, either the turned-on third transistor T3 or the turned-on fifth transistor T5 may turn off, and either the first LED uLED1 or the second LED uLED2 may turn off.

The voltage of the first node N1 may be determined by the on/off of the first transistor T1 and the second transistor T2.

A gate voltage of the first transistor T1 is determined by the first control signal CTRL1, and the on/off of the first transistor T1 may be determined by the first control signal CTRL1.

A gate voltage of the second transistor T2 is determined by a voltage of a gate node GN. A ramp voltage which increases or decreases with time may be supplied to the gate node GN. A starting value of this ramp voltage may be determined based on the grayscale value of the pixel P.

The gate node GN may be connected to a data line. Also, the voltage of the gate node GN may be determined by a data voltage VDT supplied through the data line. A gate control circuit 230 may be arranged between the gate node GN and the data line.

Hereinafter, for the case where the second LED uLED2 cannot be used at all or properly because of a defect in it, primary signals, voltages, and currents in the pixel circuit will be described with reference to FIG. 2 and FIG. 3A with respect to an example in which the fourth transistor T4 is selected between the fourth transistor T4 and the sixth transistor T6 by the first selection signal SEL1 and the second selection signal SEL2 so that the first LED uLED1 is used. On the contrary, for the case where the first LED uLED1 cannot be used at all or properly because of a defect in it, primary signals, voltages, and currents in the pixel circuit will be described with reference to FIG. 2 and FIG. 3B with respect to an example in which the sixth transistor T6 is selected between the fourth transistor T4 and the sixth transistor T6 by the first selection signal SEL1 and the second selection signal SEL2 so that the second LED uLED2 is used.

Figure 3A:
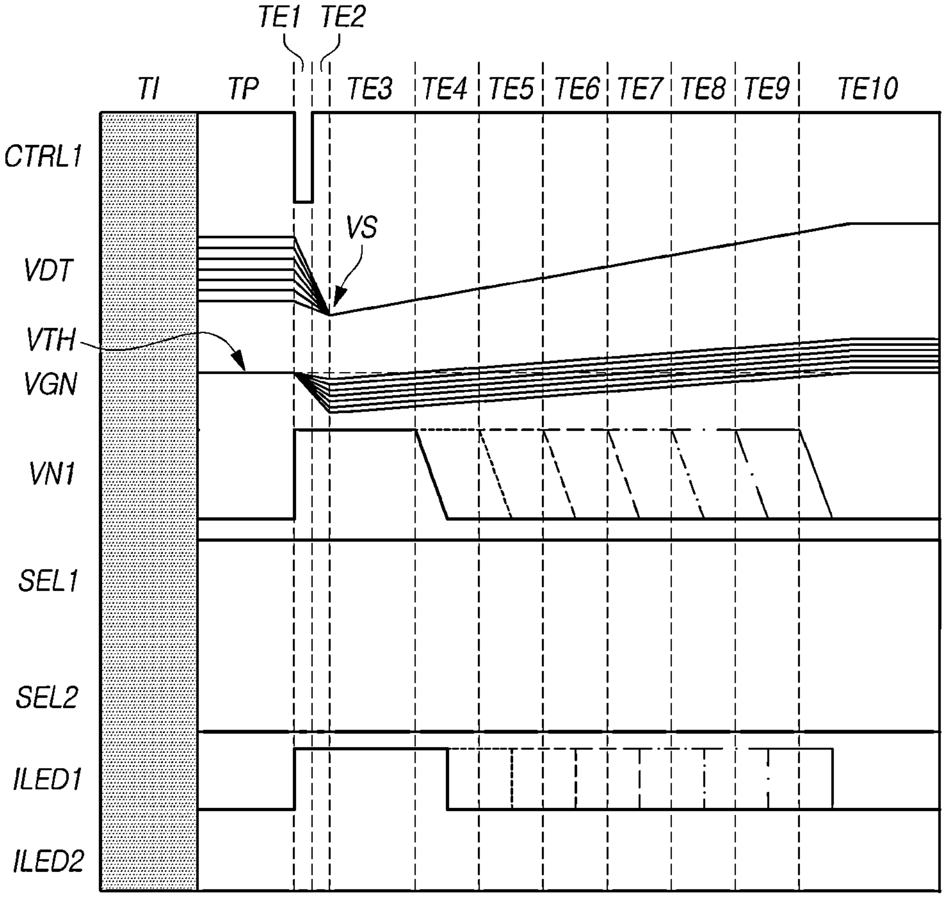
FIG. 3A is a waveform diagram of primary signals, voltages, and currents in a pixel circuit according to the first example using the first LED.

FIG. 3A is a waveform diagram of primary signals, voltages, and currents in a pixel circuit according to the first example using the first LED.

Referring to FIG. 2 and FIG. 3A, a control cycle of a pixel Pa may be divided into an initialization period TI, a program period TP, and a light emission control period TE1 to TE10. Here, the control cycle of the pixel Pa may be equal to the duration of one frame or 1H (horizontal) period.

During the initialization period T1, the program period TP, and the light emission control period TE1 to TE10, a turn-on signal as the first selection signal SEL1 is applied to the gate of the fourth transistor, and a turn-off signal as the second selection signal SEL2 is applied to the sixth transistor T6. Accordingly, the fourth transistor T4 turns on to select the third transistor T3 and the first ELD uLED1. The sixth transistor T6 turns off so that the fifth transistor T5 and the second LED uLED2 are not selected, thus having no effect on the operation of the pixel P afterwards.

As described previously, instead of applying a turn-on signal as the first selection signal SEL1 to the gate of the fourth transistor during the initialization period T1, the program period TP, and the light emission control period TE1 to TE10, a turn-on signal may be applied as the first selection signal SEL1 to the gate of the fourth transistor only during the initialization period T1 and the light emission control period TE1 to TE10.

The initialization period TI is a period of time in which the voltages of terminals of each node and each transistor are initialized, for which a variety of schemes may be applied. These schemes will be described in more detail in examples to be described later.

The program period TP is a period of time in which a particular voltage is written onto primary nodes and primary transistors.

During the program period TP of the first example, the first control signal CTRL1 may turn off the first transistor T1 while forming a high voltage. Although not shown, the connection control transistor TRG may turn on to form a low driving voltage VSS at the second node N2. Here, the low driving voltage VSS may be a ground voltage.

During the program period TP, as the second transistor T2 turns on, a voltage VN1 at the first node may become a low voltage. In this instance, a gate voltage VGN of the second transistor T2 may be equal to a threshold voltage VTH of the second transistor T2. In other words, although the second transistor T2 turns on during the program period TP, almost no substantial current flows to a drain-source of the second transistor T2.

During the program period TP, as the voltage VN1 at the first node N1 becomes a low voltage, the third transistor T3 turns off, and the driving current ILED1 of the first LED uLED1 becomes OA. The fifth transistor T5 also turns off, and the driving current ILED2 of the second LED uLED2 becomes OA.

During the program period TP, the data voltage VDT may become an initial voltage.

The pixel driver may determine the initial voltage based on the grayscale value of the pixel Pa, and set the data voltage as the initial voltage and supply it to the data line.

The initial voltage supplied to the data line may be written on the gate control circuit 230. The initial voltage may be written on one side of the gate control circuit 230, the gate voltage VGN may be written on the other side, and the gate control circuit 230 may maintain this both side voltage (initial voltage—gate voltage) during the subsequent control cycle.

The light emission control period TE1 to TE10 may be divided into a plurality of sub-periods TE1 to TE10.

During the first sub-period TE1 and second sub-period TE2, among the plurality of sub-periods TE1 to TE10, the pixel driver may change the data voltage VDT to a preset constant voltage VS.

Since the gate control circuit 230 arranged between the data line and the gate node GN maintains the both side voltage (initial voltage—gate voltage), the change in the data voltage VDT may cause a change in the gate voltage VGN. Also, such a change may result in the gate voltage VGN being lower than the threshold voltage VTH and turn off the second transistor T2.

Meanwhile, during the first sub-period TE1, the first transistor T1 may turn on in response to the first control signal CTRL1, and the voltage VN1 at the first node may become the high driving voltage VDD. Also, the third transistor T3 may turn on by the voltage VN1 at the first node, and the first LED uLED1 may emit light as a first driving current ILED1 flows to the first LED uLED1.

The light emission of the first LED uLED1 may continue as the gate voltage VGN maintains a lower voltage than the threshold voltage VTH.

From the third sub-period TE3 onward, the pixel driver may increase or decrease the data voltage VDT with a constant gradient from the constant voltage VS. Also, in response to such an increase or decrease in the data voltage VDT, the gate voltage VGN changes, and the gate voltage VGN becomes higher than the threshold voltage VTH, thereby turning off the first LED uLED1.

From the third sub-period TE3 onward, the gate voltage VGN may be in the form of a ramp voltage which increases or decreases with a constant gradient. In this instance, during the program period TP, the starting value of the ramp voltage may be determined by an initial voltage supplied to the data line.

Since the gate control circuit 230 maintains the both side voltage (initial voltage—gate voltage), the data voltage VDT may change from the initial voltage to the constant voltage VS, and therefore the gate voltage VGN also may change to a different voltage, which serves as the starting value of the ramp voltage.

Figure 3B:
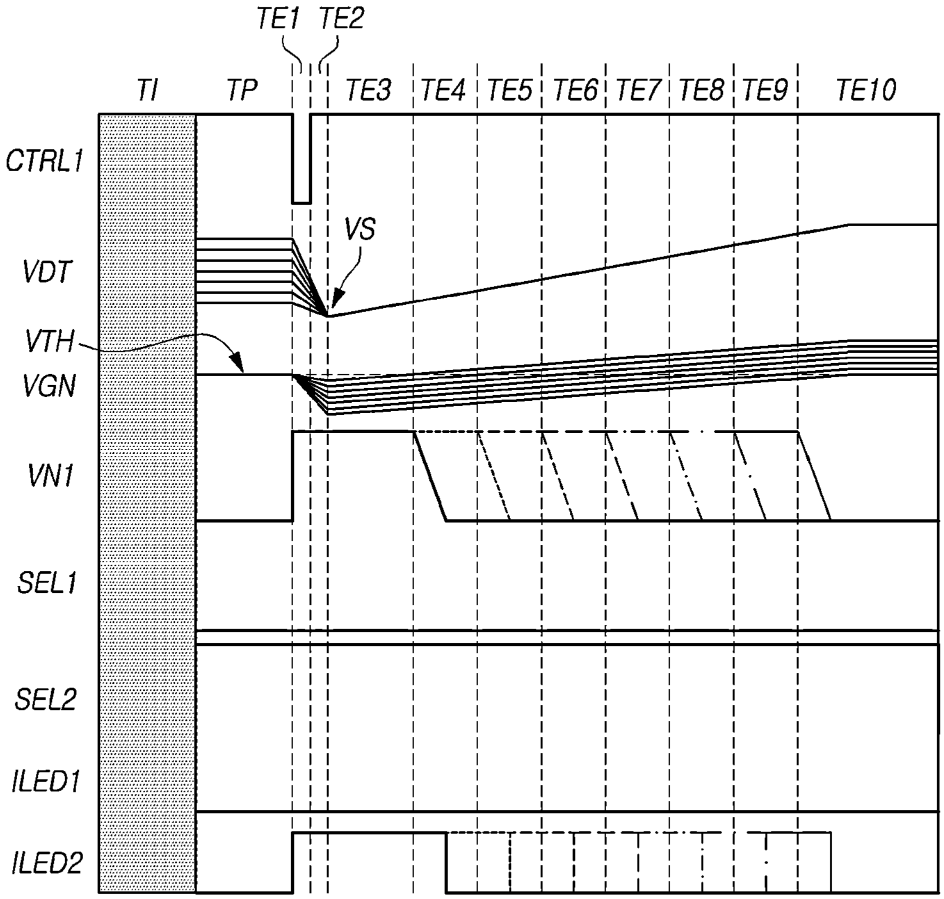
FIG. 3B is a waveform diagram of primary signals, voltages, and currents in a pixel circuit according to the first example using the second LED.

FIG. 3B is a waveform diagram of primary signals, voltages, and currents in a pixel circuit according to the first example using the second LED.

Referring to FIG. 2 and FIG. 3B, a control cycle of a pixel Pa may be divided into an initialization period TI, a program period TP, and a light emission control period TE1 to TE10.

During the initialization period T1, the program period TP, and the light emission control period TE1 to TE10, a turn-off signal as the first selection signal SEL1 is applied to the gate of the fourth transistor, and a turn-on signal as the second selection signal SEL2 is applied to the sixth transistor T6. Accordingly, the fourth transistor T4 turns off so that the third transistor T3 and the first ELD uLED1 are not selected, thus having no effect on the operation of the pixel Pa afterwards. The sixth transistor T6 turns on to select the fifth transistor T5 and the second LED uLED2.

As for a particular voltage written onto primary nodes and primary transistors during the initialization period T1 and the program period TP, the description given with reference to FIG. 3A may apply equally.

However, it should be noted that, as the voltage VN1 at the first node N1 becomes a low voltage during the program period TP, the fifth transistor T5 turns off and the driving current ILED2 of the second LED uLED2 become OA.

During the program period TP, the data voltage VDT may become an initial voltage.

The pixel driver may determine the initial voltage based on the grayscale value of the pixel Pa, and set the data voltage as the initial voltage and supply it to the data line. The initial voltage supplied to the data line may be written onto the gate control circuit 230. The initial voltage may be written onto one side of the gate control circuit 230, the gate voltage VGN may be written onto the other side, and the gate control circuit 230 may maintain this both side voltage (initial voltage—gate voltage) during the subsequent control cycle.

The light emission control period TE1 to TE10 may be divided into a plurality of sub-periods TE1 to TE10.

During the first sub-period TE1 and second sub-period TE2, among the plurality of sub-periods TE1 to TE10, the pixel driver may change the data voltage VDT to a preset constant voltage VS.

Meanwhile, during the first sub-period TE1, the first transistor T1 may turn on in response to the first control signal CTRL1, and the voltage VN1 at the first node may become the high driving voltage VDD. Also, the fifth transistor T5 may turn on by the voltage VN1 at the first node, and the second LED uLED2 may emit light as a second driving current ILED2 flows to the second LED uLED2.

The light emission of the second LED uLED2 may continue as the gate voltage VGN maintains a lower voltage than the threshold voltage VTH.

From the third sub-period TE3 onward, the pixel driver may increase or decrease the data voltage VDT with a constant gradient from the constant voltage VS. Also, in response to such an increase or decrease in the data voltage VDT, the gate voltage VGN changes, and the gate voltage VGN becomes higher than the threshold voltage VTH, thereby turning off the second LED uLED2.

From the third sub-period TE3 onward, the gate voltage VGN may be in the form of a ramp voltage which increases or decreases with a constant gradient. In this instance, during the program period TP, the starting value of the ramp voltage may be determined by an initial voltage supplied to the data line.

Since the gate control circuit 230 maintains the both side voltage (initial voltage—gate voltage), the data voltage VDT may change from the initial voltage to the constant voltage VS, and therefore the gate voltage VGN also may change to a different voltage, which serves as the starting value of the ramp voltage.

The pixel Pa may turn on and off according to the PWM scheme in which its turn-on and turn-off are determined by comparing the gate voltage VGN and the threshold voltage VTH. By the way, a factor determining the turn-on time of PWM is the initial value of the data voltage VDT. In this respect, the embodiment can be seen as a hybrid method of PAM and PWM.

Moreover, for the case where the second LED uLED2 cannot be used at all or properly because of a defect in it, the fourth transistor T4 may be selected by the first selection signal SEL1 and the second selection signal SEL2 so that the first LED uLED1 is used. On the contrary, for the case where the first LED uLED1 cannot be used at all or properly because of a defect in it, the sixth transistor T6 may be selected by the first selection signal SEL1 and the second selection signal SEL2 so that the second LED uLED2 is used. Accordingly, a display panel can be used without a repair process if an LED is defective or a defective pixel occurs in a transfer process.

Figure 4:
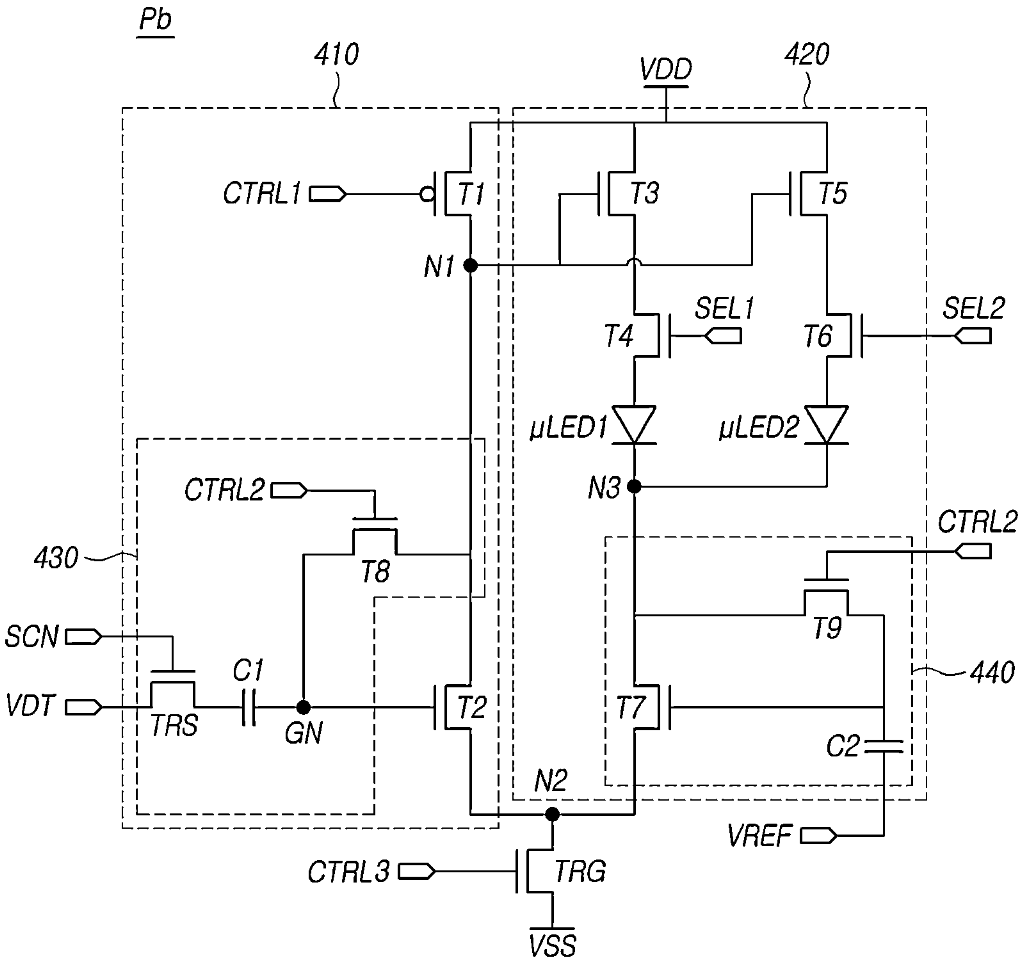
FIG. 4 is a configuration diagram of a second example of a pixel according to an embodiment.

FIG. 4 is a configuration diagram of a second example of a pixel according to an embodiment.

Referring to FIG. 4, a pixel Pb may include a first path circuit 410, a second path circuit 420, a connection control transistor TRG, and so on.

The first path circuit 410 may include a first transistor T1 for controlling the supply of the high driving voltage VDD to the first node N1 and a second transistor T2 for controlling the supply of the low driving voltage VSS to the first node N1.

The second path circuit 420 may include a third transistor T3 for controlling the supply of the high driving voltage VDD to an anode of the first LED uLED1, a fourth transistor T4 arranged between the first LED uLED1 and the third transistor T3, a fifth transistor T5 for controlling the supply of the high driving voltage to the anode of the second LED uLED2 arranged in parallel with the first LED uLED1, a sixth transistor T6 arranged between the second LED uLED2 and the fifth transistor T5, and a seventh transistor T7 for controlling the supply of the low driving voltage to the cathodes of the first LED uLED1 and second LED uLED2.

In the case of the second path circuit 420, only either the fourth transistor T4 or the sixth transistor T6 may be selected by a first selection signal SEL1 and a second selection signal SEL2, so that only either the first LED uLED1 or the second LED uLED2 may emit light.

The gate of the third transistor T3 may be connected to the first node N1, and the other side thereof may be connected to one side of the fourth transistor T4. Also, when the high driving voltage VDD is formed at the first node N1, the third transistor T3 may turn on. While the third transistor T3 is on, the fourth transistor T4 may be selected by the first selection signal SEL1 and the second selection signal SEL2, and when the low driving voltage VSS is supplied to the cathode of the first LED uLED1, the first LED uLED1 may emit light.

The gate of the fifth transistor T5 may be connected to the first node N1, and the other side thereof may be connected to one side of the sixth transistor T6. Also, when the high driving voltage VDD is formed at the first node N1, the fifth transistor T5 may turn on. While the fifth transistor T5 is on, the sixth transistor T6 may be selected by the first selection signal SEL1 and the second selection signal SEL2, and when the low driving voltage VS S is supplied to the cathode of the second LED uLED2, the second LED uLED2 may emit light.

A ramp voltage which increases or decreases with time may be supplied to the gate of the second transistor T2 in a period during which either the first LED uLED1 or the second LED uLED2 emits light. Also, the starting value of such a ramp voltage may be determined based on the grayscale value of the pixel Pb.

One side of the connection control transistor TRG may be connected to the second node N2 which is a contact point between the second transistor T2 and the seventh transistor T7, and the other side thereof may be connected to the low driving voltage VS S.

The first path circuit 410 may further include a gate control circuit 430, and the second path circuit 420 may further include a current control circuit 440.

The gate control circuit 430 may further include an eighth transistor T8 for controlling a connection between the gate and drain of the second transistor T2. While the connection control transistor TRG is off, the first transistor T1 and the eighth transistor T8 may turn on, thus making the gate-source voltage of the second transistor T2 equal to the threshold voltage of the second transistor.

The gate control circuit 430 may further include a first capacitor C1 arranged between the gate of the second transistor T2 and the data line. A threshold voltage may be written onto the gate-source of the second transistor, and the initial voltage may be written onto one side of the first capacitor which is connected to the data line. Also, the first capacitor C1 may maintain the both side voltage thus formed.

The current control circuit 440 may further include a ninth transistor T9 for controlling a connection between the gate and drain of the seventh transistor T7. While the connection control transistor TRG is off, the third transistor T3 and the ninth transistor T9 may turn on, thus making the gate-source voltage of the seventh transistor T7 equal to the threshold voltage of the seventh transistor T7.

The current control circuit 440 may further include a second capacitor C2 whose one side is connected to the gate of the seventh transistor T7. After the threshold voltage is written onto the gate-source of the seventh transistor T7, a reference voltage VREF may be fed into the other side of the second capacitor C2.

Moreover, the amplitude of the first driving current ILED1 of the first LED uLED1 or the amplitude of the second driving current ILED2 of the second LED uLED2 may be controlled based on the voltage level of the reference voltage VREF.

As for connections, in the first path circuit 410, one side of the first transistor T1 may be connected to the high driving voltage VDD, and the other side may be connected to the first node N1.

Also, one side of the second transistor T2 may be connected to the first node N1, and the other side may be connected to the second node N2. Also, one side of the eighth transistor T8 may be connected to the drain of the second transistor T2, and the other side may be connected to the gate of the second transistor T2. One side of the first capacitor C1 may be connected to the gate of the second transistor T2, and the other side may be connected to one side of the scan transistor TRS. Also, the other side of the scan transistor TRS may be connected to the data line.

In the second path circuit 420, one side of the third transistor T3 may be connected to the high driving voltage VDD, and the other side may be connected to one side of the fourth transistor T4.

One side of the fourth transistor T4 may be connected to the other side of the third transistor T3, and the other side may be connected to the first LED uLED1. The gate of the fourth transistor T4 may be connected to the first selection line and receive the first selection signal SELL The anode of the first LED uLED1 may be connected to the other side of the fourth transistor T4, and the cathode of the first LED uLED1 may be connected to the third node N3.

One side of the fifth transistor T5 may be connected to the high driving voltage VDD, and the other side may be connected to one side of the sixth transistor T6. Also, the gate of the fifth transistor T5 may be connected to the first node N1.

One side of the sixth transistor T6 may be connected to the other side of the fifth transistor T5, and the other side may be connected to the second LED uLED2. The gate of the sixth transistor T6 may be connected to the second selection line and receive the second selection signal SEL2.

The anode of the second LED uLED2 may be connected to the other side of the sixth transistor T6, and the cathode of the second LED uLED2 may be connected to the third node N3.

Moreover, one side of the seventh transistor T7 may be connected to the cathodes of the first LED uLED1 and second LED uLED2, and the other side may be connected to the second node N2. Also, one side of the ninth transistor T9 may be connected to the drain of the seventh transistor T7, and the other side may be connected to the gate of the seventh transistor T7. One side of the second capacitor C2 may be connected to the gate of the seventh transistor T7, and the reference voltage VREF may be supplied to the other side thereof.

In addition, the first control signal CTRL1 may be fed to the gate of the first transistor T1, the second control signal CTRL2 may be fed to the eight transistor T8 and the ninth transistor T9, and a third control signal CTRL3 may be fed to the connection control transistor TRG. Also, the scan signal SCN may be fed to the scan transistor TRS.

Hereinafter, for the case where the second LED uLED2 cannot be used at all or properly because of a defect in it, primary signals, voltages, and currents in the pixel circuit will be described with reference to FIG. 4, FIG. 5A, and FIGS. 6 to 10 with respect to an example in which the fourth transistor T4 is selected between the fourth transistor T4 and the sixth transistor T6 by the first selection signal SEL1 and the second selection signal SEL2 so that the first LED uLED1 is used. On the contrary, for the case where the first LED uLED1 cannot be used at all or properly because of a defect in it, primary signals, voltages, and currents in the pixel circuit will be described with reference to FIG. 4, FIG. 5B, and FIGS. 11 to 15 with respect to an example in which the sixth transistor T6 is selected between the fourth transistor T4 and the sixth transistor T6 by the first selection signal SEL1 and the second selection signal SEL2 so that the second LED uLED2 is used.

Figure 5A:
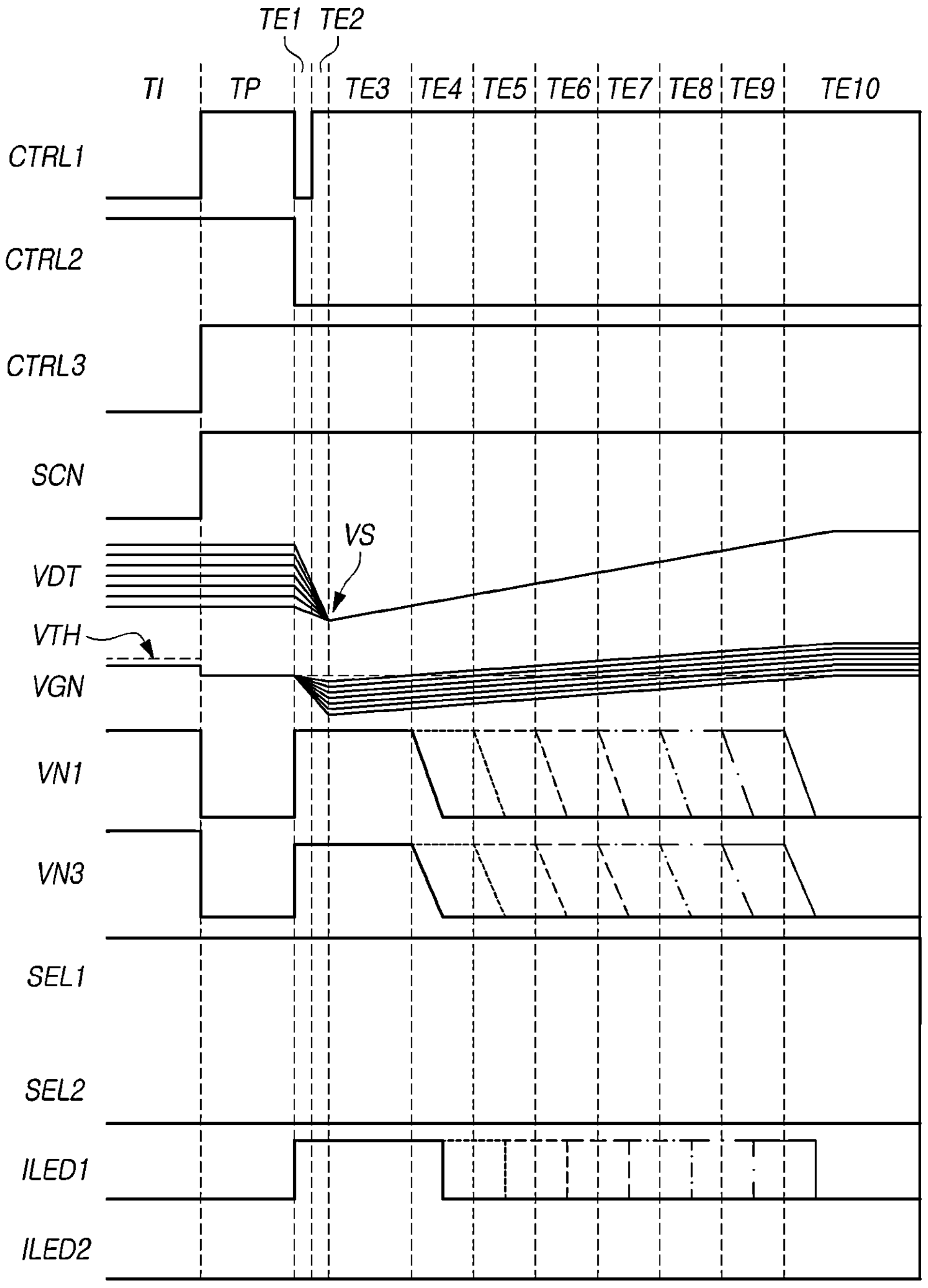
FIG. 5A is a waveform diagram of primary signals, voltages, and currents in a pixel circuit according to the second example using the first LED.
Figure 5B:
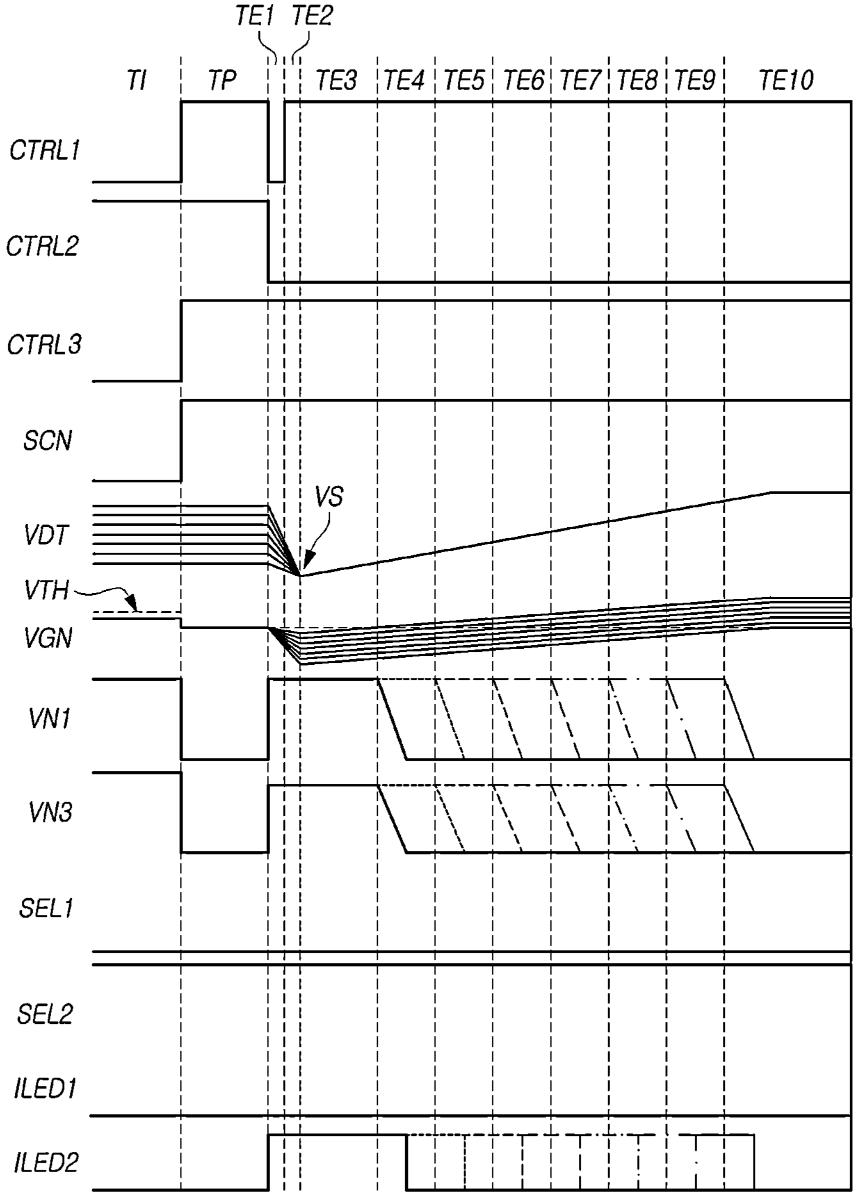
FIG. 5B is a waveform diagram of primary signals, voltages, and currents in a pixel circuit according to the second example using the second LED.

FIG. 5A is a waveform diagram of primary signals, voltages, and currents in a pixel circuit according to the second example using the first LED. FIG. 5B is a waveform diagram of primary signals, voltages, and currents in a pixel circuit according to the second example using the second LED.

Figure 6:
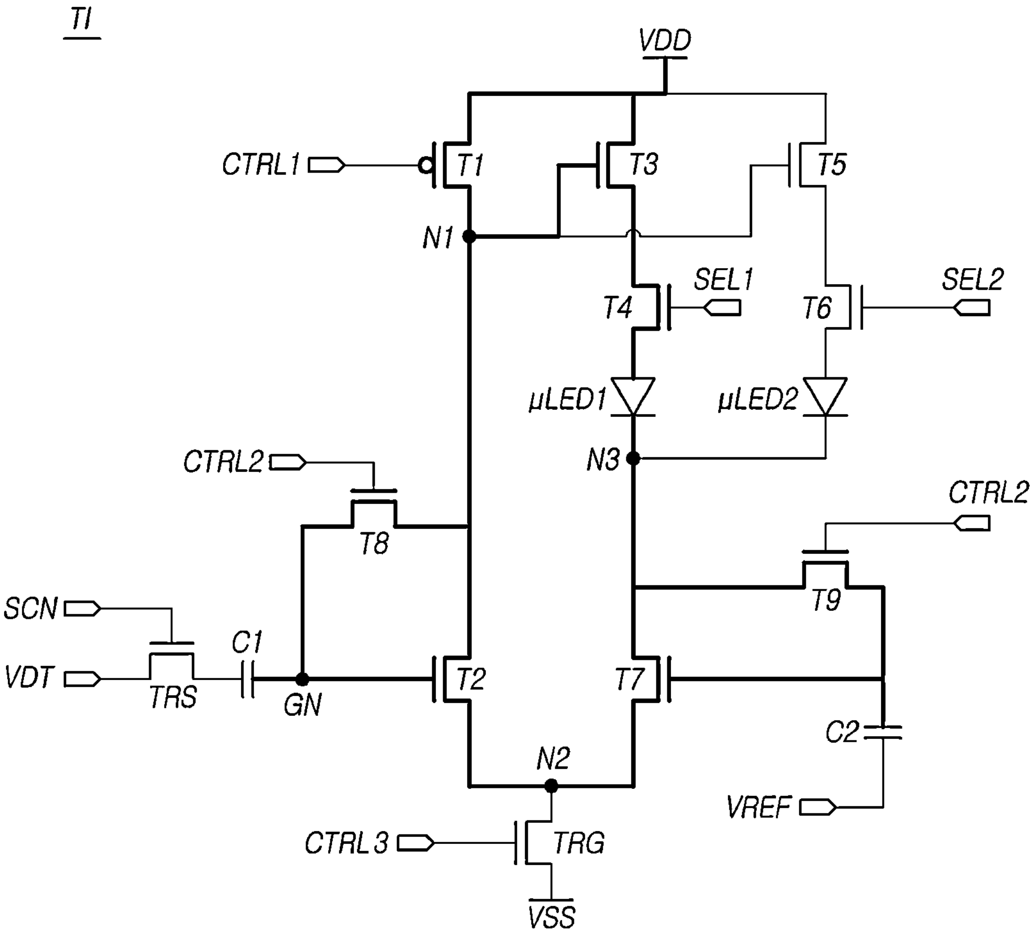
FIG. 6 is a view showing components that turn on during the initialization period of the second example using the first LED.
Figure 7:
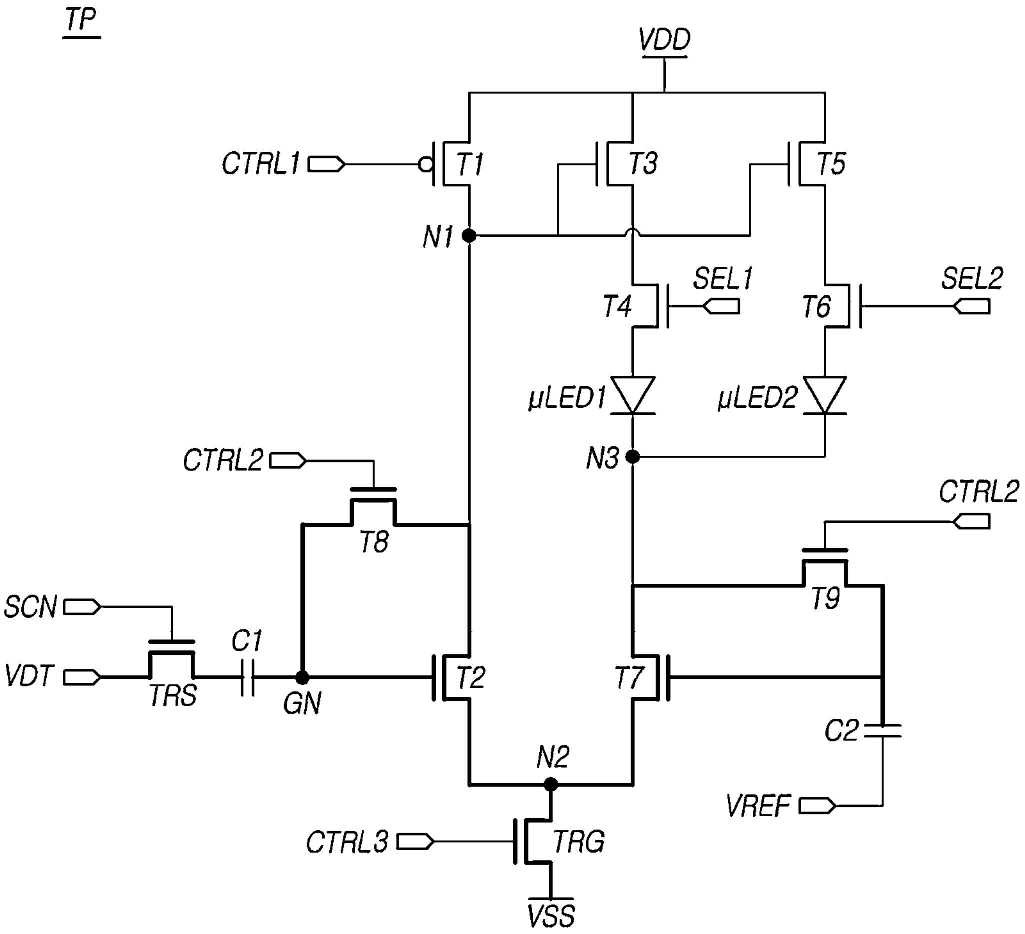
FIG. 7 is a view showing components that turn on during the program period of the second example using the first LED.
Figure 8:
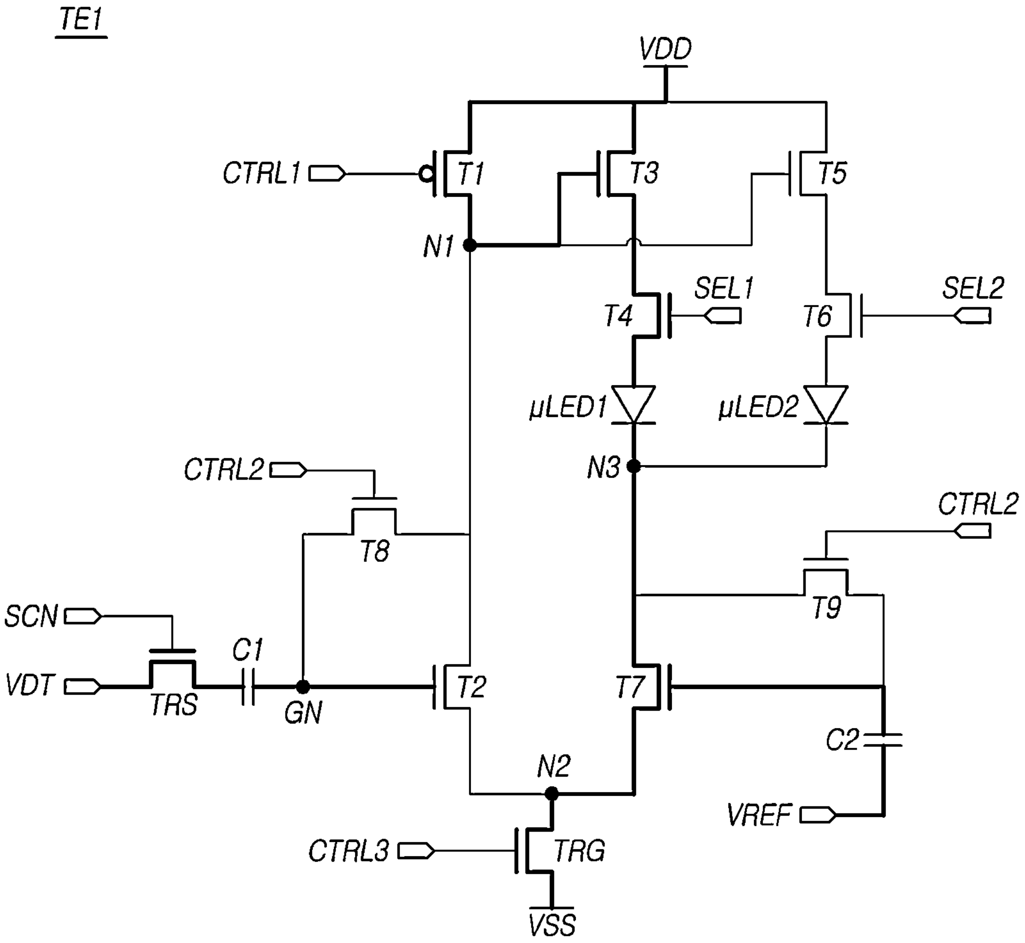
FIG. 8 is a view showing components that turn on during the first sub-period of the light emission control period of the second example using the first LED.
Figure 9:
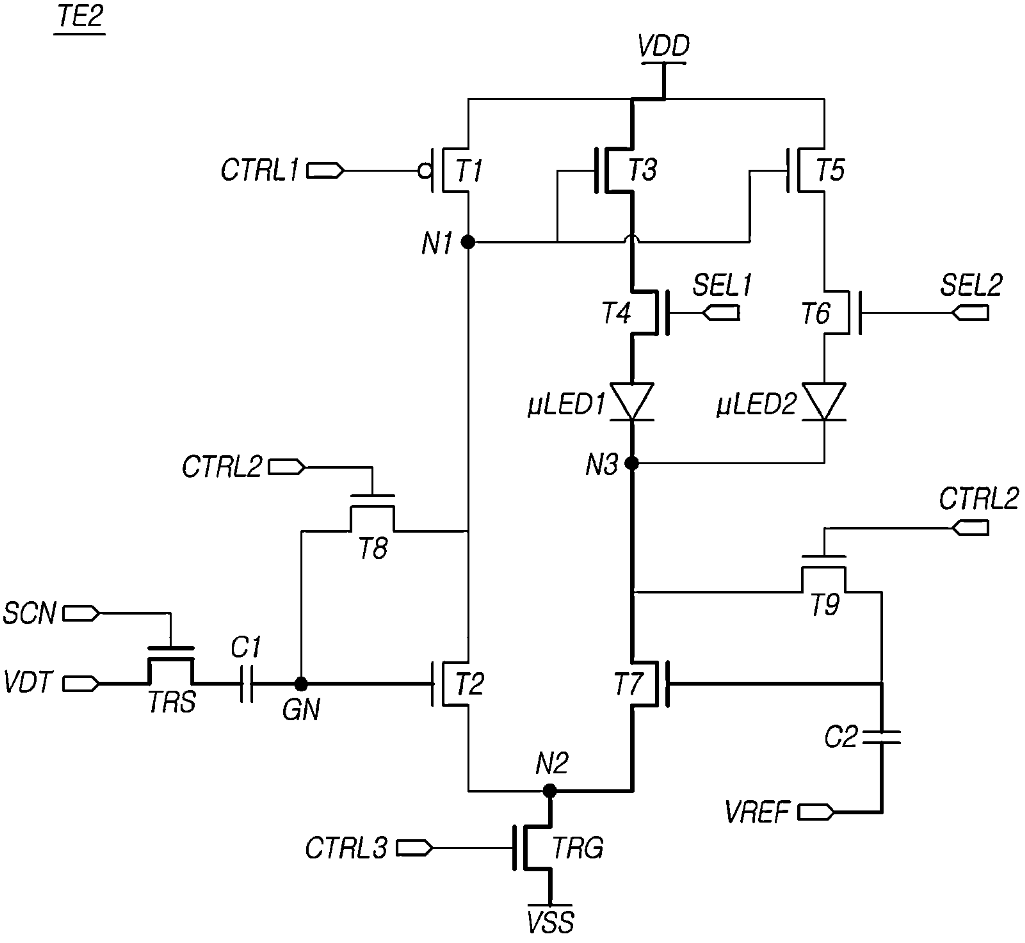
FIG. 9 is a view showing components that turn on during the second sub-period of the light emission control period of the second example using the first LED.
Figure 10:
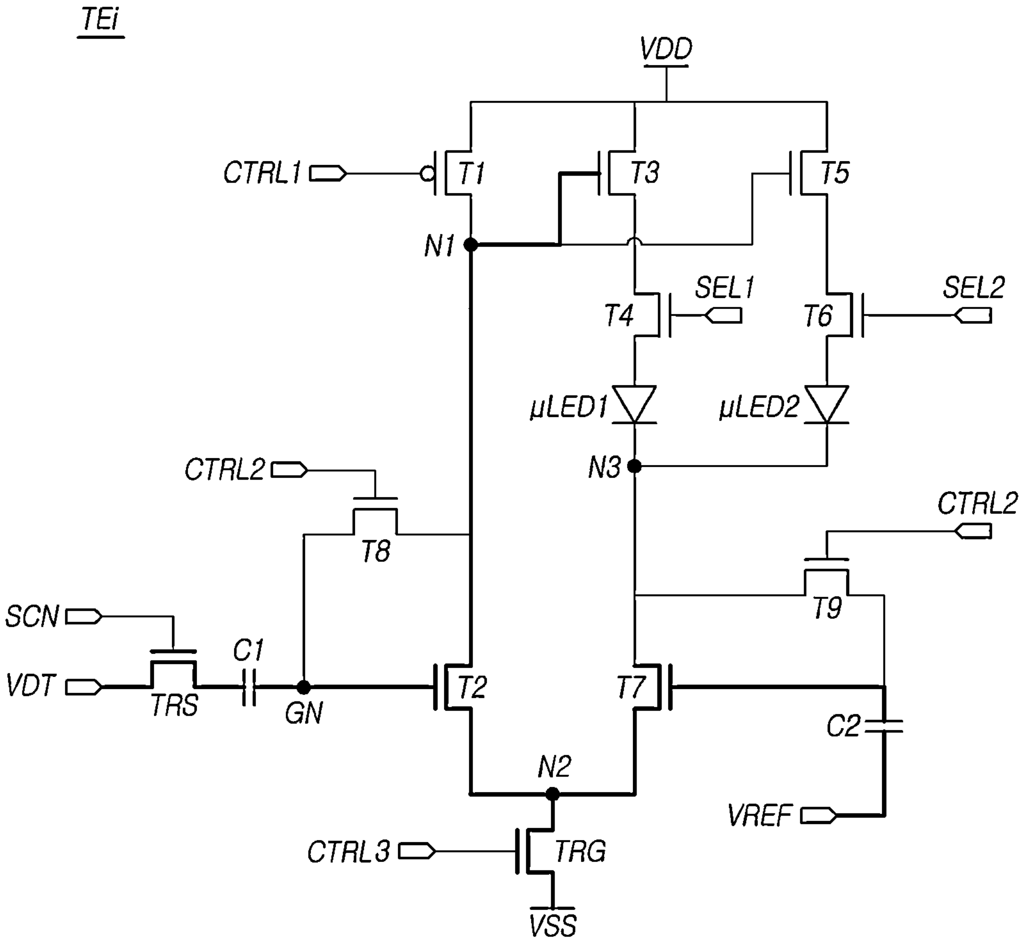
FIG. 10 is a view showing components that turn on during a sub-period in which the LED turns off, during the light emission control period of the second example using the first LED.

Furthermore, FIG. 6 is a view showing components that turn on during the initialization period of the second example using the first LED. FIG. 7 is a view showing components that turn on during the program period of the second example using the first LED. FIG. 8 is a view showing components that turn on during the first sub-period of the light emission control period of the second example using the first LED. FIG. 9 is a view showing components that turn on during the second sub-period of the light emission control period of the second example using the first LED. FIG. 10 is a view showing components that turn on during a sub-period in which the LED turns off, during the light emission control period of the second example using the first LED.

Referring to FIG. 4, FIG. 5A, and FIGS. 6 to 10, a control cycle of a pixel Pb may be divided into an initialization period TI, a program period TP, and a light emission control period TE1 to TE10.

During the initialization period T1, the program period TP, and the light emission control period TE1 to TE10, a turn-on signal as the first selection signal SEL1 is applied to the gate of the fourth transistor, and a turn-off signal as the second selection signal SEL2 is applied to the sixth transistor T6. Accordingly, the fourth transistor T4 turns on to select the third transistor T3 and the first ELD uLED1. The sixth transistor T6 turns off so that the fifth transistor T5 and the second LED uLED2 are not selected, thus having no effect on the operation of the pixel Pb afterwards.

During the initialization period, the first transistor T1, the second transistor T2, the third transistor T3, the fourth transistor T4, the seventh transistor T7, the eighth transistor T8, and the ninth transistor T9 may turn on, and the connection control transistor TRG and the scan transistor TRS may turn off. Accordingly, the first node N1, the gate node GN, the second node N2, and the third node N3 may be initialized to the high driving voltage VDD.

During the program period TP, the first transistor T1 and the third transistor T3 may turn off, and the second transistor T2, the seventh transistor T7, the eighth transistor T8, the ninth transistor T9, the connection control transistor TRG, and the scan transistor TRS may turn on. Accordingly, the voltage VGN at the gate node GN of the second transistor T2 may be programmed to be equal to the threshold voltage VTH of the second transistor T2, and the gate voltage of the seventh transistor T7 may be programmed to be equal to the threshold voltage of the seventh transistor T7.

Also, an initial voltage corresponding to the grayscale value of the pixel Pb may be supplied as the data voltage VDT during the program period TP. Accordingly, the initial voltage may be formed at one side of the first capacitor C1, and the threshold voltage VTH of the second transistor T2 may be formed at the other side.

The both side voltage (initial voltage—threshold voltage of second transistor) of the first capacitor C1 may be maintained during the light emission control period TE1 to TE10 as well.

The light emission control period TE1 to TE10 may be divided into a plurality of sub-periods.

Moreover, during the first sub-period TE1, the first transistor T1, the seventh transistor T7, the connection control transistor TRG, and the scan transistor TRS may turn on.

In addition, as the first transistor T1 turns on, the high driving voltage VDD may be formed at the first node N1, and therefore the third transistor T3 may turn on.

Furthermore, as the reference voltage VREF is supplied to the other side of the second capacitor C2, the gate voltage of the seventh transistor T7 may be maintained at an appropriate level, and the driving current ILED1 of the first LED uLED1 may be controlled at a constant level.

During the first sub-period TE1 and the second sub-period TE2, the data voltage VDT may be changed to a preset constant voltage VS. In response to such a change, the gate voltage VGN may be changed to a starting voltage. The starting voltage may be equal to a voltage obtained by subtracting the both side voltage of the first capacitor C1 from the constant voltage VS, which may be expressed by the following equation:

Starting voltage=Constant voltage−(Initial voltage−Threshold voltage)

During the first sub-period TE1, as the gate voltage VGN becomes lower than the threshold voltage of the second transistor T2, the second transistor T2 may turn off, and the LED may turn on.

During the second sub-period TE2, the first transistor T1 may turn off, and the other transistors may maintain their state, thereby maintaining the light emission of the LED.

From the third sub-period TE3 onward, the data voltage VDT may increase with a constant gradient from the constant voltage VS. Thus, as the gate voltage VGN increases and the gate voltage VGN becomes higher than the threshold voltage VTH during an i-th (i is a natural number equal to or greater than 3) sub-period TEi, the second transistor T2 may turn on, and the voltage VN1 at the first node N1 may fall to the low driving voltage VSS. Also, in response to the voltage VN1 at the first node N1, the third transistor T3 may turn off, and the first LED uLED1 may turn off To help understanding, the third node N3 and the voltage VN3 at the third node N3 are indicated in FIG. 4, FIG. 5A, and FIGS. 6 to 10.

Figure 11:
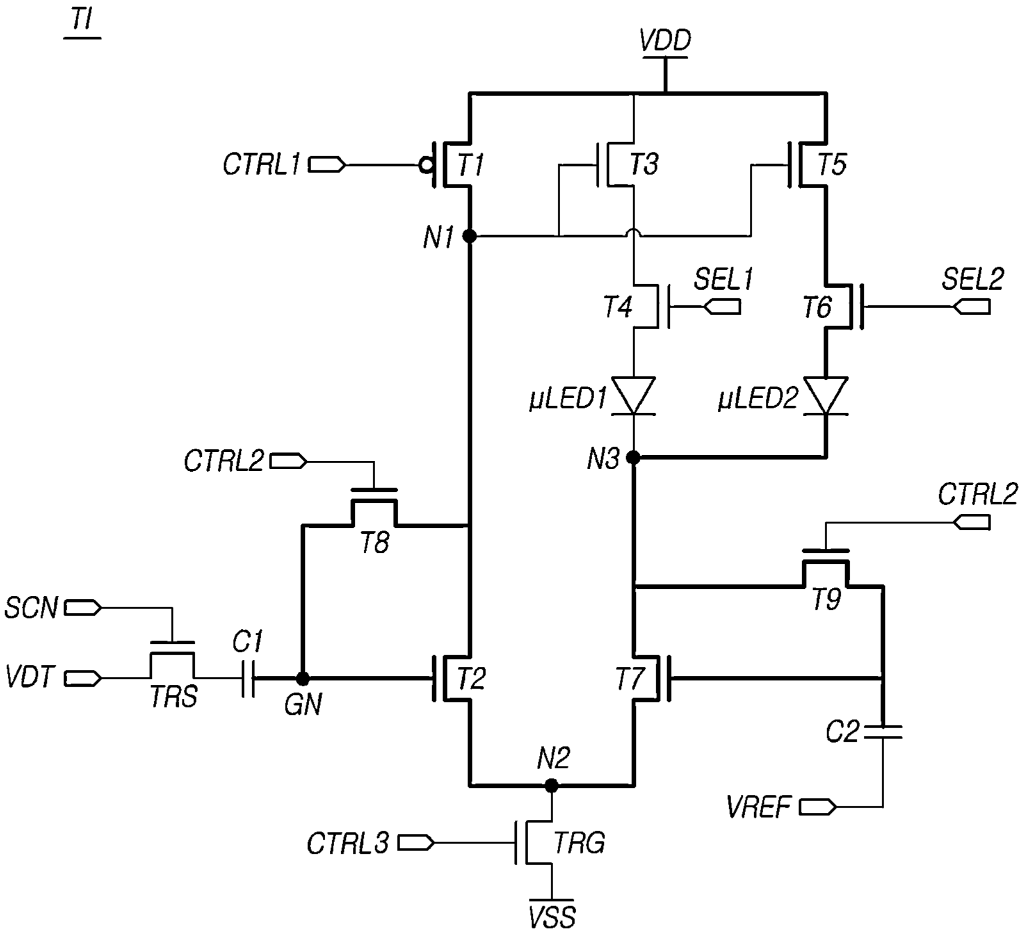
FIG. 11 is a view showing components that turn on during the initialization period of the second example using the second LED.
Figure 12:
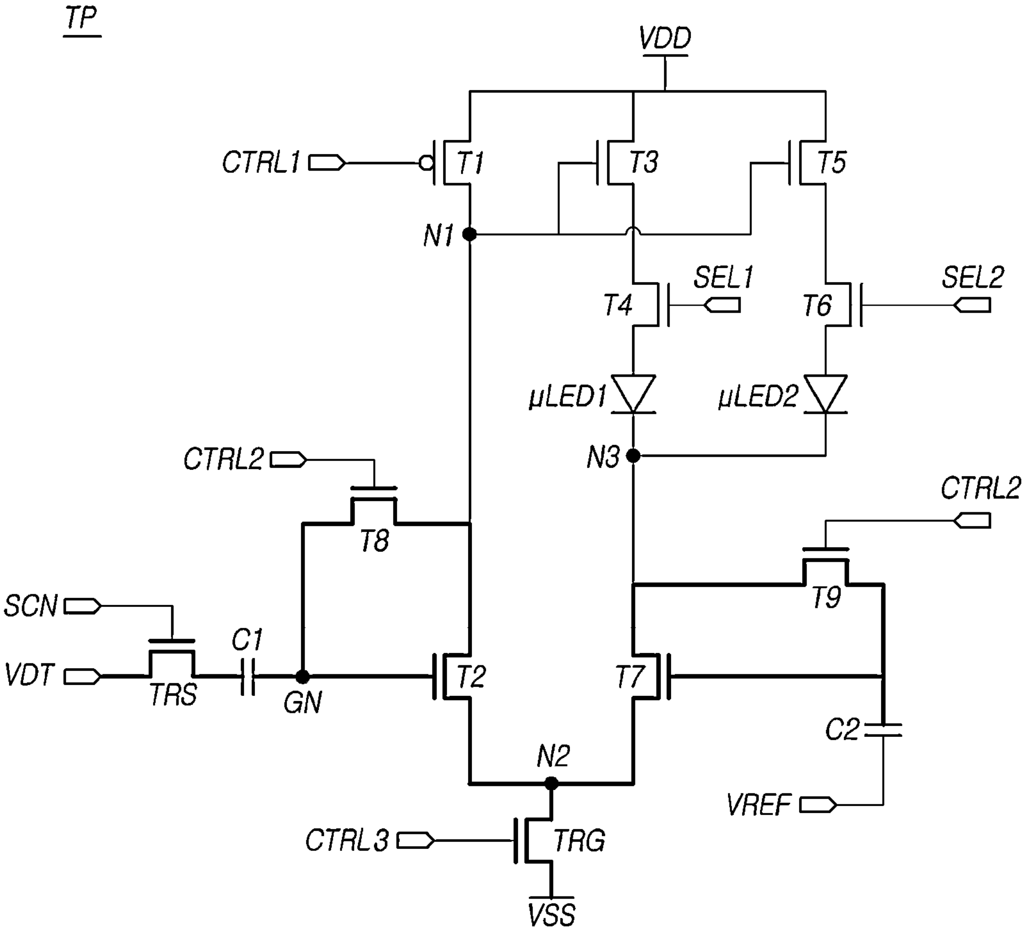
FIG. 12 is a view showing components that turn on during the program period of the second example using the second LED.
Figure 13:
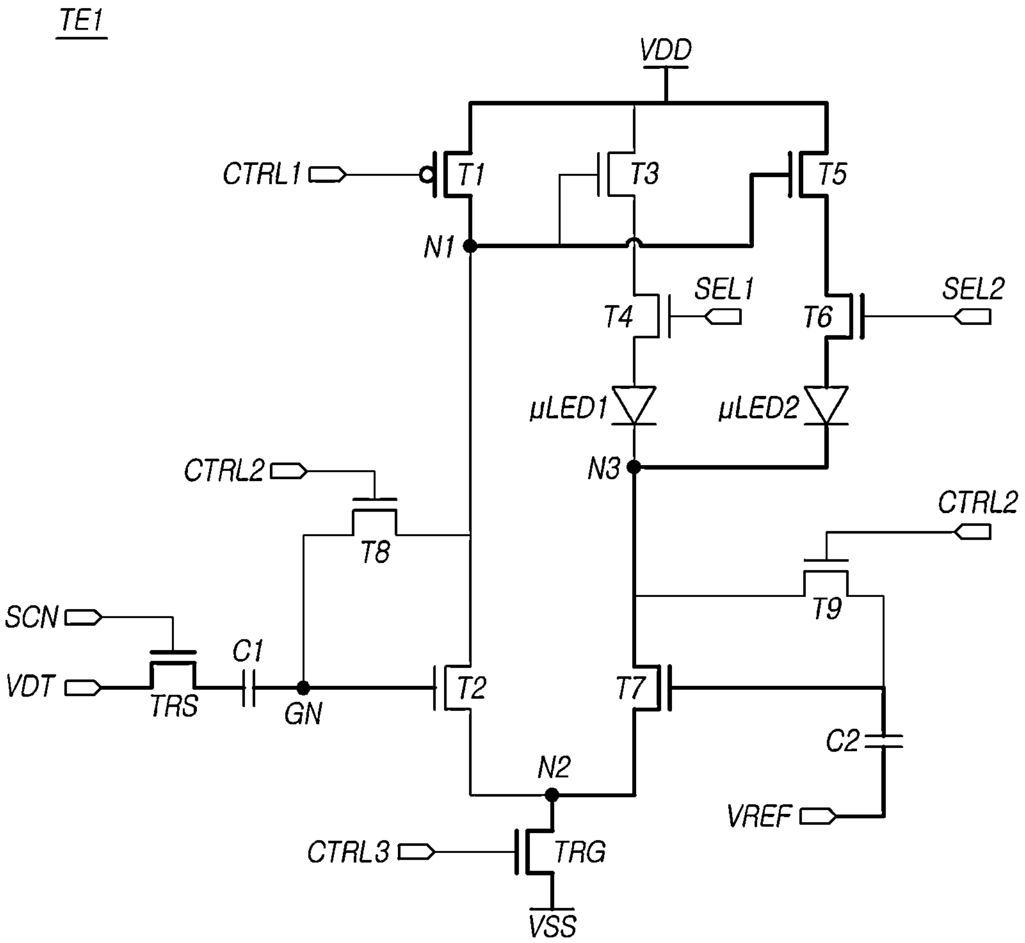
FIG. 13 is a view showing components that turn on during the first sub-period of the light emission control period of the second example using the second LED.
Figure 14:
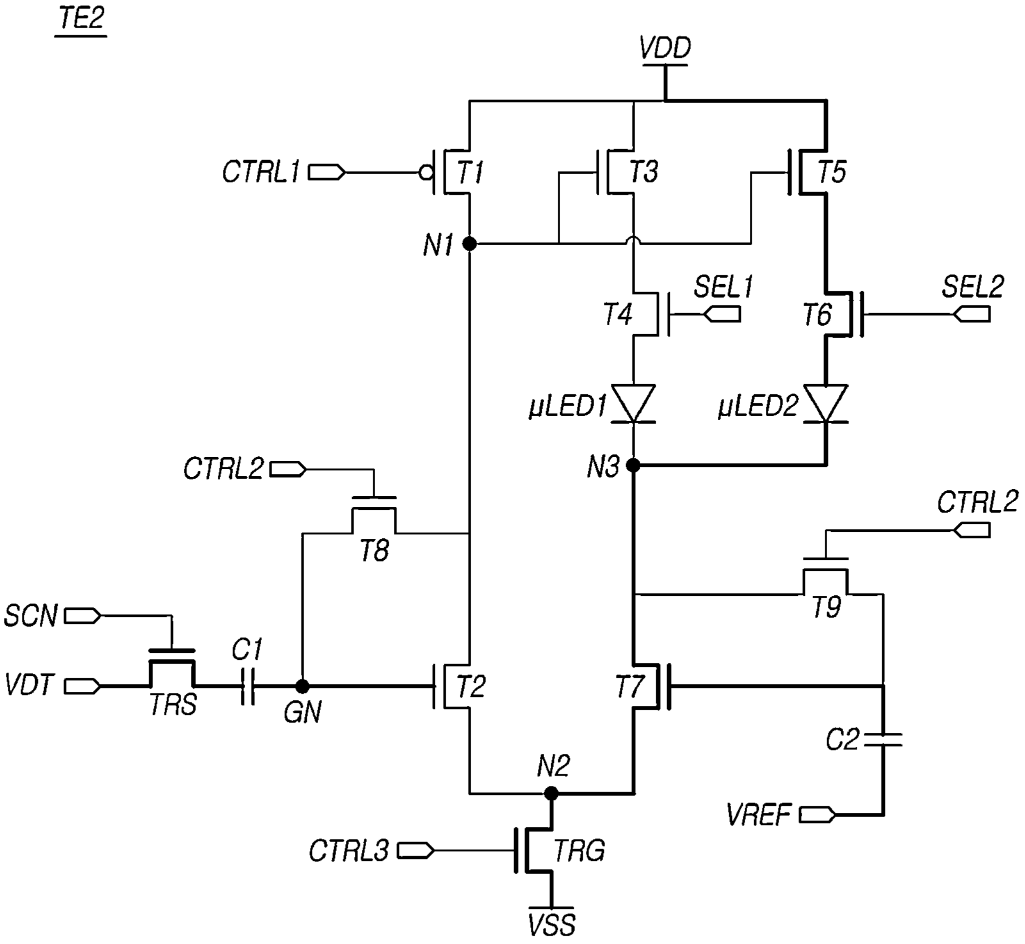
FIG. 14 is a view showing components that turn on during the second sub-period of the light emission control period of the second example using the second LED.
Figure 15:
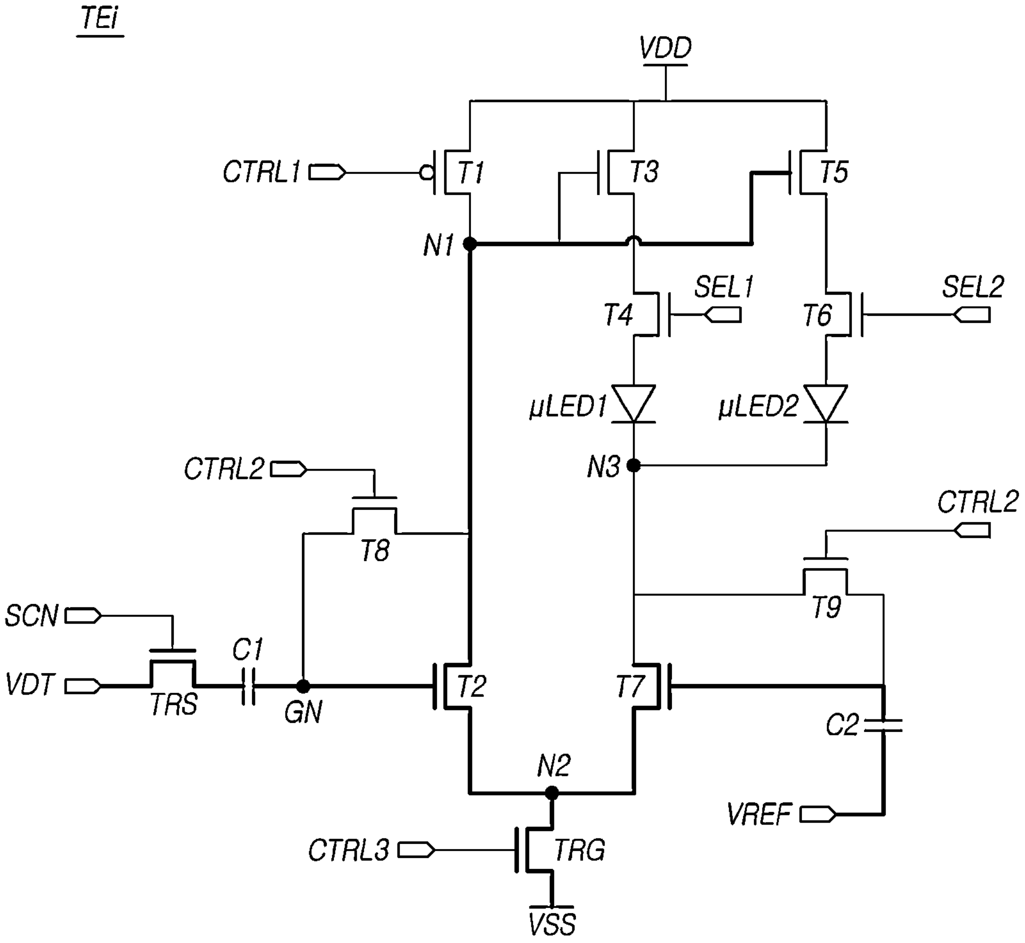
FIG. 15 is a view showing components that turn on during a sub-period in which the LED turns off, during the light emission control period of the second example using the second LED.

Furthermore, FIG. 11 is a view showing components that turn on during the initialization period of the second example using the second LED. FIG. 12 is a view showing components that turn on during the program period of the second example using the second LED. FIG. 13 is a view showing components that turn on during the first sub-period of the light emission control period of the second example using the second LED. FIG. 14 is a view showing components that turn on during the second sub-period of the light emission control period of the second example using the second LED. FIG. 15 is a view showing components that turn on during a sub-period in which the LED turns off, during the light emission control period of the second example using the second LED.

Referring to FIG. 4, FIG. 5B, and FIGS. 11 to 15, a control cycle of a pixel Pb may be divided into an initialization period TI, a program period TP, and a light emission control period TE1 to TE10.

During the initialization period T1, the program period TP, and the light emission control period TE1 to TE10, a turn-off signal as the first selection signal SEL1 is applied to the gate of the fourth transistor, and a turn-on signal as the second selection signal SEL2 is applied to the sixth transistor T6. Accordingly, the fourth transistor T4 turns off so that the third transistor T3 and the first ELD uLED1 are not selected, thus having no effect on the operation of the pixel Pb afterwards. The sixth transistor T6 turns on to select the fifth transistor T5 and the second LED uLED2.

During the initialization period, the first transistor T1, the second transistor T2, the fifth transistor T5, the sixth transistor T6, the seventh transistor T7, the eighth transistor T8, and the ninth transistor T9 may turn on, and the connection control transistor TRG and the scan transistor TRS may turn off. Accordingly, the first node N1, the gate node GN, the second node N2, and the third node N3 may be initialized to the high driving voltage VDD.

During the program period TP, the first transistor T1 and the fifth transistor T5 may turn off, and the second transistor T2, the seventh transistor T7, the eighth transistor T8, the ninth transistor T9, the connection control transistor TRG, and the scan transistor TRS may turn on. Accordingly, the voltage VGN at the gate node GN of the second transistor T2 may be programmed to be equal to the threshold voltage VTH of the second transistor T2, and the gate voltage of the seventh transistor T7 may be programmed to be equal to the threshold voltage of the seventh transistor T7.

Also, an initial voltage corresponding to the grayscale value of the pixel Pb may be supplied as the data voltage VDT during the program period TP. Accordingly, the initial voltage may be formed at one side of the first capacitor C1, and the threshold voltage VTH of the second transistor T2 may be formed at the other side.

The both side voltage (initial voltage—threshold voltage of second transistor) of the first capacitor C1 may be maintained during the light emission control period TE1 to TE10 as well.

The light emission control period TE1 to TE10 may be divided into a plurality of sub-periods.

Moreover, during the first sub-period TE1, the first transistor T1, the seventh transistor T7, the connection control transistor TRG, and the scan transistor TRS may turn on.

In addition, as the first transistor T1 turns on, the high driving voltage VDD may be formed at the first node N1, and therefore the fifth transistor T5 may turn on.

Furthermore, as the reference voltage VREF is supplied to the other side of the second capacitor C2, the gate voltage of the seventh transistor T7 may be maintained at an appropriate level, and the driving current ILED2 of the second LED uLED2 may be controlled at a constant level.

During the first sub-period TE1 and the second sub-period TE2, the data voltage VDT may be changed to a preset constant voltage VS. In response to such a change, the gate voltage VGN may be changed to a starting voltage. The starting voltage may be equal to a voltage obtained by subtracting the both side voltage of the first capacitor C1 from the constant voltage VS, which may be expressed by the following equation:

$$\text{Starting voltage}=\text{Constant voltage}-(\text{Initial voltage}-\text{Threshold voltage})$$

During the first sub-period TE1, as the gate voltage VGN becomes lower than the threshold voltage of the second transistor T2, the second transistor T2 may turn off, and the LED may turn on.

During the second sub-period TE2, the first transistor T1 may turn off, and the other transistors may maintain their state, thereby maintaining the light emission of the LED.

From the third sub-period TE3 onward, the data voltage VDT may increase with a constant gradient from the constant voltage VS. Thus, as the gate voltage VGN increases and the gate voltage VGN becomes higher than the threshold voltage VTH during an i-th (i is a natural number equal to or greater than 3) sub-period TEi, the second transistor T2 may turn on, and the voltage VN1 at the first node N1 may fall to the low driving voltage VSS. Also, in response to the voltage VN1 at the first node N1, the fifth transistor T5 may turn off, and the second LED uLED2 may turn off To help understanding, the third node N3 and the voltage VN3 at the third node N3 are indicated in FIG. 4, FIG. 5B, and FIGS. 11 to 15.

Here, the pixel Pb may be formed on a silicon backplane, and the transistors arranged in the pixel may be formed as CMOS (complementary metal-oxide-silicon) type.

The pixel also may be formed on an oxide backplane.

Figure 16:
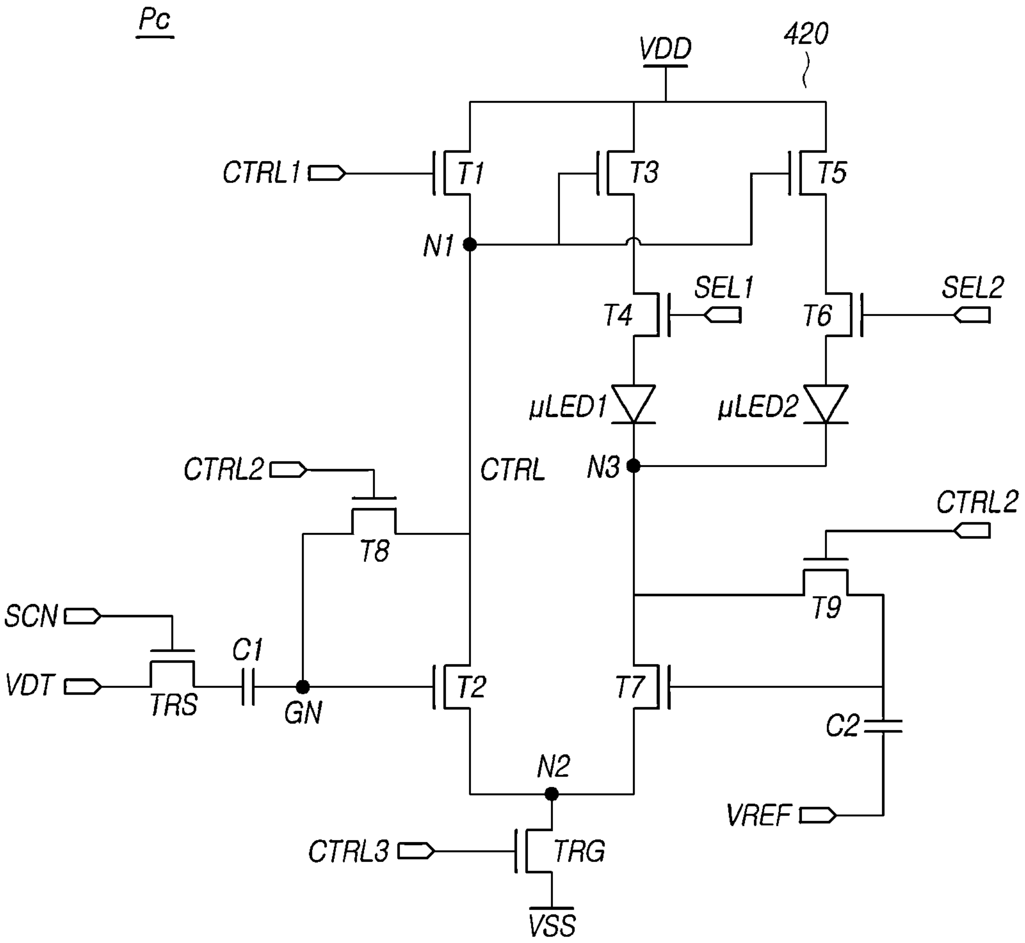
FIG. 16 is a configuration diagram of a third example of a pixel according to an embodiment.

FIG. 16 is a configuration diagram of a third example of a pixel according to an embodiment.

In FIG. 16, the pixel Pc may be formed on an oxide backplane. The transistors arranged in the pixel Pc may be formed as NMOS (N-channel metal-oxide-silicon) type.

In the pixel of the third example, compared to the pixel of the second example illustrated in FIG. 4, only the first transistor T1 may be formed as N-type, and the other transistors may be formed as N-type. Or else, all the transistors may be formed as PMOS (P-channel metal-oxide silicon) type.

In operation, only the first control signal CTRL1 fed to the first transistor T1 may have a waveform inverted from the waveform in the second example, and the other signals may have the same waveform as in the second example.

The pixel may be formed on an LTPS (low temperature polysilicon) backplane.

Figure 17:
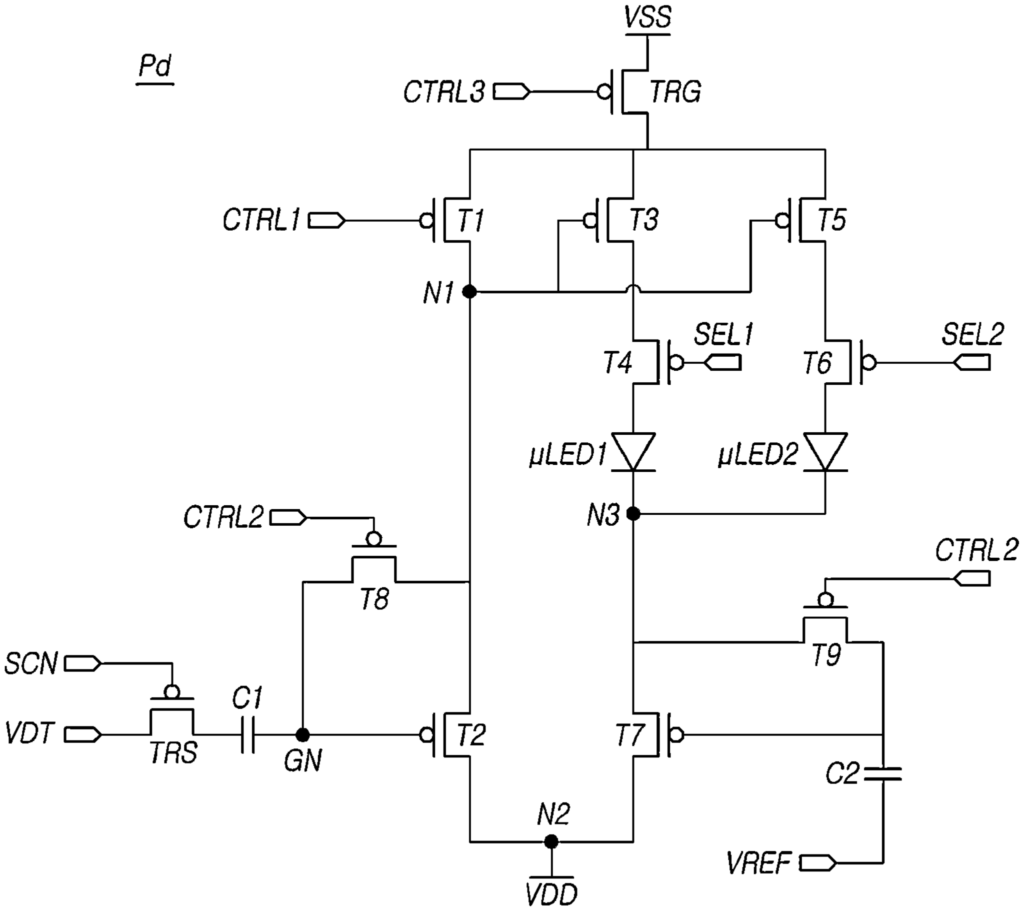
FIG. 17 is a configuration diagram of a fourth example of a pixel according to an embodiment.

FIG. 17 is a configuration diagram of a fourth example of a pixel according to an embodiment.

Referring to FIG. 17, the pixel Pd may be formed on an LTPS backplane.

In the pixel of the fourth example, compared to the pixel of the third example illustrated in FIG. 16, all the transistors may be formed as P-type. And, in the fourth example, compared to the third example, the supply positions of the high driving voltage VDD and the low driving voltage VSS may be opposite. On the contrary, all the transistors may be formed as N-type.

In operation, all the control signals may have a waveform inverted from the waveform in the third example. Also, the data voltage VDT and the reference voltage VREF may have opposite voltage levels.

Figure 19:
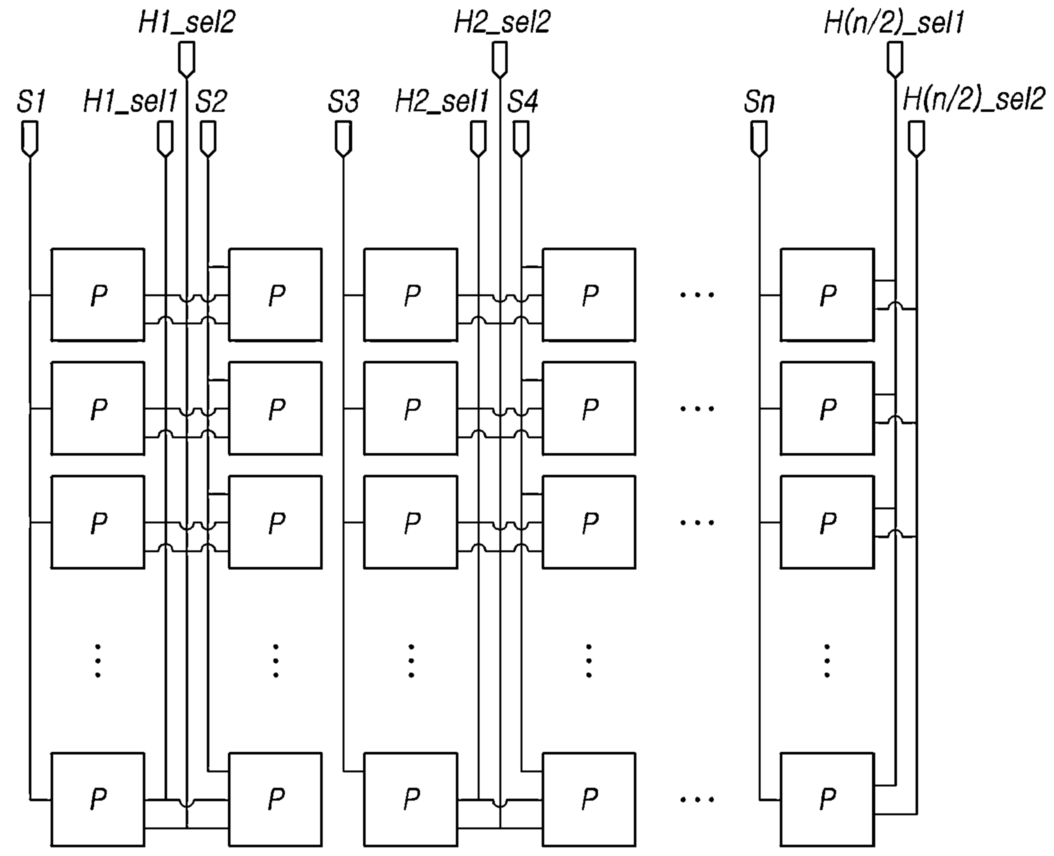

FIGS. 18 and 19 are views of a pixel arrangement on a display panel according to other embodiments.

Referring to FIG. 4 and FIG. 18, a display panel according to another embodiment may include a plurality of pixels P.

As for the plurality of pixels P, n pixels and m pixels P (m and n are an integer greater than 2) are arranged in a matrix form in a first direction and a second direction, respectively.

The gates of the scan transistors TRS of the m pixels in the second direction are electrically connected to one scan line through which scan signals Si to Sn are supplied, the gates of the fourth transistors T4 of the m pixels P in the second direction are electrically connected to one first selection line through which a first selection signal (one of H1_sel1 to Hn_sel1) is supplied, and the gates of the sixth transistors T6 of the m pixels in the second direction are electrically connected to one second selection line through which a second selection signal (one of H1_sel2 to Hn_se12) is supplied.

The first selection line and the second selection line may be connected to the gate driver 130 of FIG. 1.

The display panel according to another embodiment may store, in a memory, selection information based on which the first selection signal (one of H1_sel1 to Hn_sel1) and the second selection signal (one of H1_sel2 to Hn_sel2) are determined, and then supply the first selection signal (one of H1_sel1 to Hn_sel1) and the second selection signal (one of H1_sel2 to Hn_se12) to the fourth and sixth transistors T4 and T6 of the pixels P through the gate driver 130.

Referring to FIG. 4 and FIG. 19, the gates of the fourth transistors T4 of two or more pixels P in the first direction may be commonly electrically connected to one first selection line through which the first selection signal (one of H1_sel1 to H(n/2)_sel1) is supplied, and the gates of the sixth transistors T6 of two or more pixels P in the first direction may be commonly electrically connected to one second selection line through which the second selection signal (one of H1_sel2 to H(n/2)_sel2) is supplied.

Although FIG. 19 illustrates that the gates of the fourth and sixth transistors T4 and T6 of two neighboring pixels P in the first direction are commonly electrically connected to the first and second selection lines, the gates of the fourth and sixth transistors T4 and T6 of two or three or more neighboring or non-neighboring pixels P in the first direction may be commonly electrically connected to the first and second selection lines.

As described above, according to the present disclosure, it can be easier to represent low grayscale levels on a display panel where LEDs are arranged. Furthermore, according to the present disclosure, pixels can be driven in a PWM scheme without using a comparator. Furthermore, according to the present disclosure, a hybrid pixel driving technology can be used in which PAM and PWM are combined.

What is claimed is:

1. A pixel circuit comprising:

a first path circuit comprising a first transistor and a second transistor, which are arranged in series between a high driving voltage and a low driving voltage, and having a first node formed between the first transistor and the second transistor; and a second path circuit comprising a third transistor, a fourth transistor, and a first LED, which are arranged in series between the high driving voltage and the low driving voltage, and a fifth transistor, a sixth transistor, and a second LED, which are arranged in parallel with the third transistor, the fourth transistor, and the first LED, wherein gates of the third transistor and the fifth transistor are electrically connected to the first node and only either the fourth transistor or the sixth transistor is selected so that either the first LED or the second LED emits light, wherein a ramp voltage, which increases or decreases with time, is supplied to a gate of the second transistor and a starting value of the ramp voltage is determined based on a grayscale value of the pixel.

2. The pixel circuit of claim 1, wherein a gate-source voltage of the second transistor increases or decreases according to the ramp voltage and an LED turns off at the moment when the gate-source voltage becomes equal to a threshold voltage of the second transistor.

3. The pixel circuit of claim 1, wherein a control cycle for a pixel is divided into an initialization period, a program period, and a light emission control period, wherein an initial voltage corresponding to the grayscale value of the pixel is written onto the pixel during the program period and the starting value is set depending on the initial voltage at an early stage of the light emission control period.

4. The pixel circuit of claim 3, wherein a capacitor is arranged between the gate of the second transistor and a data line and the initial voltage is written onto the capacitor.

5. The pixel circuit of claim 4, wherein a data voltage supplied to the data line is changed to a constant voltage at the early stage of the light emission control period and thereafter the data voltage increases or decreases with a constant gradient.

6. A pixel circuit comprising:

a first path circuit comprising a first transistor for controlling the supply of a high driving voltage to a first node and a second transistor for controlling the supply of a low driving voltage to the first node; and a second path circuit comprising a third transistor for controlling the supply of the high driving voltage to an anode of a first LED, a fourth transistor arranged between the first LED and the third transistor, a fifth transistor for controlling the supply of the high driving voltage to an anode of a second LED arranged in parallel with the first LED, a sixth transistor arranged between the second LED and the fifth transistor, and a seventh transistor for controlling the supply of the low driving voltage to cathodes of the first LED and the second LED, wherein gates of the third transistor and the fourth transistor are electrically connected to the first node and only either the fourth transistor or the sixth transistor is selected, wherein, once the high driving voltage is formed at the first node, the third transistor and the fifth transistor turn on, and, when only either the fourth transistor or the sixth transistor is selected to supply the low driving voltage to the cathode of one of the first and second LEDs while the third transistor and the fifth transistor are on, either the first LED or the second LED emits light, and wherein a ramp voltage which increases or decreases with time is supplied to a gate of the second transistor and a starting value of the ramp voltage is determined based on a grayscale value of a pixel.

7. The pixel circuit of claim 6, further comprising a connection control transistor, one side of which is connected to the second transistor and the seventh transistor and the other side of which is connected to the low driving voltage, for controlling a connection between the first path circuit and the second path circuit and the low driving voltage.

8. The pixel circuit of claim 7, further comprising an eighth transistor for controlling a connection between a gate and a drain of the second transistor, wherein a gate-source voltage of the second transistor becomes equal to a threshold voltage of the second transistor when the first transistor and the eighth transistor turn on while the connection control transistor is turned off.

9. The pixel circuit of claim 7, further comprising a ninth transistor for controlling a connection between a gate and a drain of the seventh transistor, wherein a gate-source voltage of the seventh transistor becomes equal to a threshold voltage of the seventh transistor when the third transistor and the ninth transistor turn on while the connection control transistor is turned off.

10. The pixel circuit of claim 6, further comprising a first capacitor arranged between the gate of the second transistor and a data line, wherein a threshold voltage is written onto a gate-source of the second transistor, an initial voltage is written onto the first capacitor, and then, a data voltage, which increases or decreases with a constant gradient, is supplied through the data line.

11. The pixel circuit of claim 6, further comprising a second capacitor, one side of which is connected to a gate of the seventh transistor, wherein a threshold voltage is written onto a gate-source of the seventh transistor and then a reference voltage is fed to the other side of the second capacitor, and the level of a current flowing to the LEDs is controlled by the reference voltage.

12. The pixel circuit of claim 6, further comprising:

a connection control transistor, one side of which is connected to the second transistor and the seventh transistor and the other side of which is connected to the low driving voltage;

an eighth transistor for controlling a connection between the gate and a drain of the second transistor;

a ninth transistor for controlling a connection between a gate and a drain of the seventh transistor;

a first capacitor arranged between the gate of the second transistor and a data line;

a scan transistor for controlling a connection between the first capacitor and the data line; and a second capacitor, one side of which is connected to the gate of the seventh transistor and the other side of which a reference voltage is fed to.

13. The pixel circuit of claim 12, wherein a control cycle for a pixel is divided into an initialization period, a program period, and a light emission control period, wherein, during the initialization period, the first transistor, the second transistor, and the ninth transistor turn on and the scan transistor and the connection control transistor turn off.

14. The pixel circuit of claim 13, wherein, during the program period subsequent to the initialization period, the eighth transistor, the ninth transistor, the scan transistor, and the connection control transistor turn on and the first transistor turns off.

15. The pixel circuit of claim 14, wherein the light emission control period subsequent to the program period is divided into a plurality of sub-periods, wherein, during a first sub-period among the plurality of sub-periods, the first transistor, the scan transistor, the connection control transistor, and the seventh transistor turn on and the eighth transistor and the ninth transistor turn off.

16. The pixel circuit of claim 6, wherein the first transistor, the second transistor, the third transistor, the fifth transistor, and the seventh transistor are formed in a CMOS (complementary metal-oxide-silicon) type on a silicon backplane, wherein the first transistor is a P-type transistor and the second transistor, the third transistor, the fifth transistor, and the seventh transistor are N-type transistors.

17. The pixel circuit of claim 6, wherein the first transistor, the second transistor, the third transistor, the fifth transistor, and the seventh transistor are formed in a NMOS (N-channel metal-oxide-silicon) type or in a PMOS (P-channel metal-oxide-silicon) type on an oxide backplane.

18. The pixel circuit of claim 12, wherein n pixels in a first direction and m pixels P in a second direction (m and n are an integer greater than 2) are arranged in a matrix form on a display panel where the pixels are arranged, gates of the scan transistors of the m pixels in the second direction are electrically connected to one scan line through which scan signals are supplied, gates of the fourth transistors of the m pixels in the second direction are electrically connected to one first selection line through which a first selection signal is supplied, and gates of the sixth transistors of the m pixels in the second direction are electrically connected to one second selection line through which a second selection signal is supplied.

19. A pixel driving apparatus in which a pixel comprises:

a first path circuit comprising a first transistor and a second transistor, which are arranged in series between a high driving voltage and a low driving voltage, and having a first node formed between the first transistor and the second transistor, and a first capacitor being arranged between a gate of the second transistor and a data line; and a second path circuit comprising a third transistor, a fourth transistor, and a first LED, which are arranged in series between the high driving voltage and the low driving voltage, and a fifth transistor, a sixth transistor, and a second LED, which are arranged in parallel with the third transistor, the fourth transistor, and the first LED, wherein gates of the third transistor and the fifth transistor are electrically connected to the first node, and only either the fourth transistor or the sixth transistor is selected so that only either the first LED or the second LED emits light, wherein a ramp voltage which increases or decreases with time is formed at the gate of the second transistor, and a data voltage determined based on a grayscale value of the pixel is supplied as a starting value of the ramp voltage to the data line.

20. The pixel driving apparatus of claim 19, wherein a control cycle for the pixel is divided into an initialization period, a program period, and a light emission control period, wherein, during the program period, an initial voltage, corresponding to the grayscale value of the pixel, is supplied as the data voltage and, during the light emission control period, the data voltage is changed to a constant voltage and then increases or decreases from the constant voltage with a constant gradient.

* * * * *